(12) United States Patent
Okazaki et al.

(10) Patent No.: US 12,194,584 B2
(45) Date of Patent: Jan. 14, 2025

(54) HANDHELD POWER TOOL, AND WORKING METHOD USING HANDHELD POWER TOOL AND WORKING PROGRAM

(71) Applicant: OMRON CORPORATION, Kyoto (JP)

(72) Inventors: Ryoji Okazaki, Kyoto (JP); Kohei Fujio, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/528,222

(22) Filed: Nov. 17, 2021

(65) Prior Publication Data

US 2022/0193846 A1 Jun. 23, 2022

(30) Foreign Application Priority Data

Dec. 17, 2020 (JP) ................................. 2020-209563

(51) Int. Cl.
*B23Q 11/00* (2006.01)
*B23Q 17/22* (2006.01)
(Continued)

(52) U.S. Cl.
CPC ...... *B23Q 11/0085* (2013.01); *B23Q 11/0046* (2013.01); *B23Q 17/2208* (2013.01);
(Continued)

(58) Field of Classification Search
CPC ............ B23Q 11/0085; B23Q 17/2208; B23Q 11/0046; G01V 3/101; F21V 33/0084
See application file for complete search history.

(56) References Cited

U.S. PATENT DOCUMENTS 4,722,021 A * 1/1988 Hornung .................. B28D 1/14
388/903
7,940,048 B2 * 5/2011 Skultety-Betz .......... G01V 3/15
324/67
(Continued)

FOREIGN PATENT DOCUMENTS

DE 10050655 C1 1/2002
DE 102006061581 A1 7/2008
(Continued)

OTHER PUBLICATIONS

German Office Action issued on Aug. 29, 2022 in a counterpart German patent application.
(Continued)

*Primary Examiner* — Daniel Jeremy Leeds
(74) *Attorney, Agent, or Firm* — METROLEX IP LAW GROUP, PLLC; Robert L. Scott, Esq.

(57) ABSTRACT

A handheld power tool 10 includes a detection signal acquisition unit 31, a determination unit 32, a display unit 24, a display control unit 34, a motor 14, and a drive control unit 13. The detection signal acquisition unit 31 acquires a detection signal that changes according to the detection strength of rebar W1 in concrete W. The determination unit 32 determines the presence or absence of the rebar W1 based on the acquisition result acquired by the detection signal acquisition unit 31. The display unit 24 displays the presence or absence of the rebar W1 by turning on different lights. The display control unit 34 controls so as to switch the color of the light displayed on the display unit 24 on the basis of the determination result by the determination unit 32. The motor 14 rotationally drives a tip tool 18*a* that works the concrete W. The drive control unit 13 controls the drive of the motor 14.

13 Claims, 20 Drawing Sheets

(51) Int. Cl.
*B25D 17/20* (2006.01)
*G01V 3/10* (2006.01)

(52) U.S. Cl.
CPC ............ *G01V 3/101* (2013.01); *B25D 17/20* (2013.01); *B25D 2222/72* (2013.01)

(56) References Cited

U.S. PATENT DOCUMENTS

| | | | |
|---|---|---|---|
| 9,937,565 B2 | 4/2018 | Hu et al. | |
| 2002/0044078 A1 | 4/2002 | Liedtke et al. | |
| 2002/0054798 A1 | 5/2002 | Dils et al. | |
| 2003/0000355 A1* | 1/2003 | Butler | B25H 1/0092 83/13 |
| 2004/0265079 A1 | 12/2004 | Dils et al. | |
| 2005/0230130 A1 | 10/2005 | Strasser et al. | |
| 2007/0107919 A1 | 5/2007 | Strasser et al. | |
| 2008/0196910 A1 | 8/2008 | Radle et al. | |
| 2009/0229842 A1 | 9/2009 | Gray et al. | |
| 2010/0202846 A1 | 8/2010 | Borunda | |
| 2017/0259419 A1* | 9/2017 | Yang | E04F 21/22 |
| 2018/0169815 A1* | 6/2018 | Barr | B25F 5/00 |
| 2019/0247991 A1* | 8/2019 | Hartmann | B25D 17/20 |
| 2022/0193846 A1 | 6/2022 | Okazaki et al. | |
| 2022/0196873 A1 | 6/2022 | Okazaki et al. | |

FOREIGN PATENT DOCUMENTS

| | | | |
|---|---|---|---|
| EP | 0366221 | A2 | 5/1990 |
| JP | S52-165492 | A | 12/1977 |
| JP | S59-150712 | A | 8/1984 |
| JP | 2000-308980 | A | 11/2000 |
| JP | 2003-215263 | A | 7/2003 |
| JP | 2005-509535 | A | 4/2005 |
| JP | 2005-297186 | A | 10/2005 |
| JP | 2010-217131 | A | 9/2010 |
| JP | 2014-231128 | A | 12/2014 |
| JP | 2018-069397 | A | 5/2018 |
| JP | 2022-96452 | A | 6/2022 |
| JP | 2022-96458 | A | 6/2022 |
| WO | 2007/141578 | A1 | 12/2007 |

OTHER PUBLICATIONS

Office Action issued on Oct. 2, 2023 in a related U.S. Appl. No. 17/528,250.
Japanese Office Action issued on Nov. 28, 2023 in a counterpart JP patent application.
Office Action (JPOA) issued on Jan. 16, 2024 in a related Japanese patent application, with English translation.
Office Action (JPOA) issued on Jul. 30, 2024 in a related Japanese patent application No. 2020-209571.

* cited by examiner

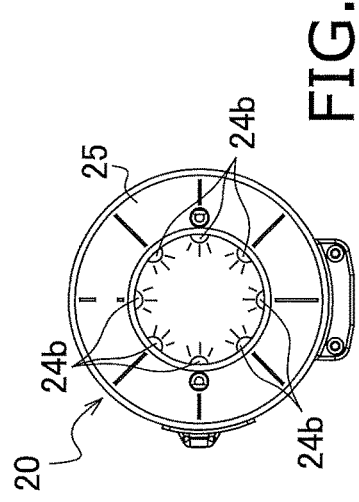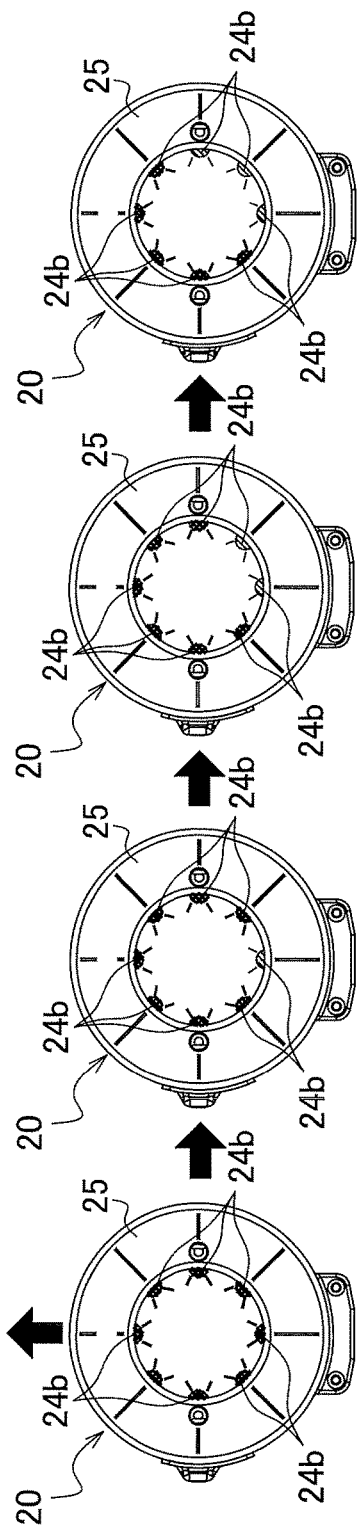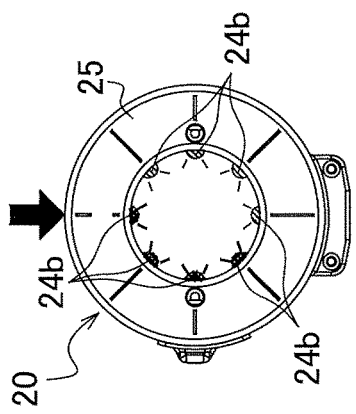

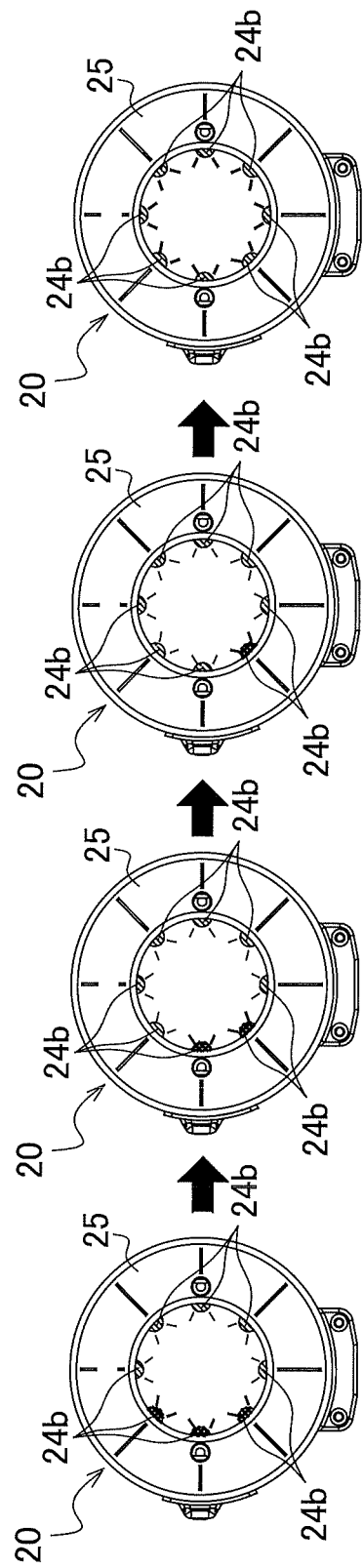
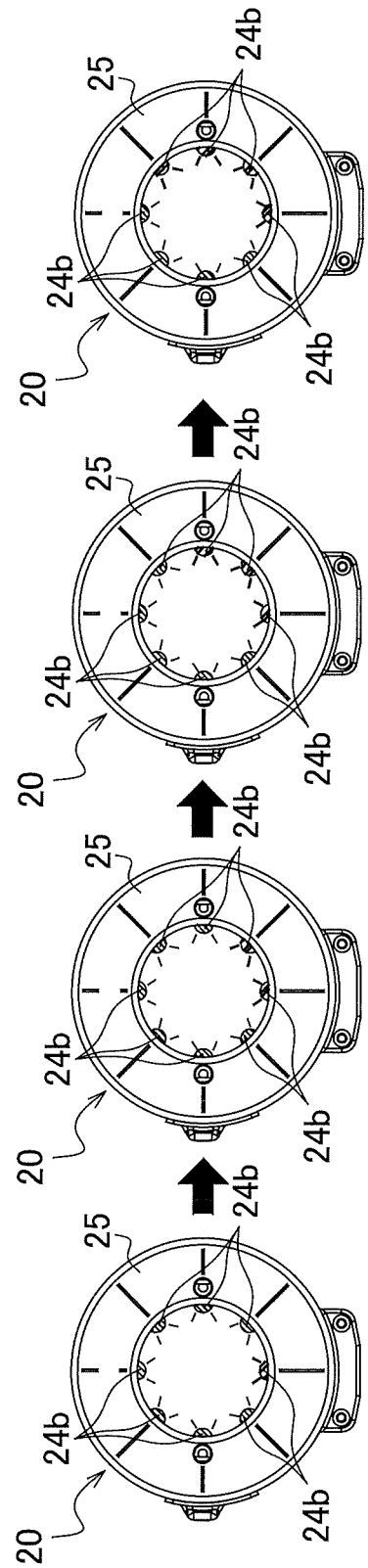

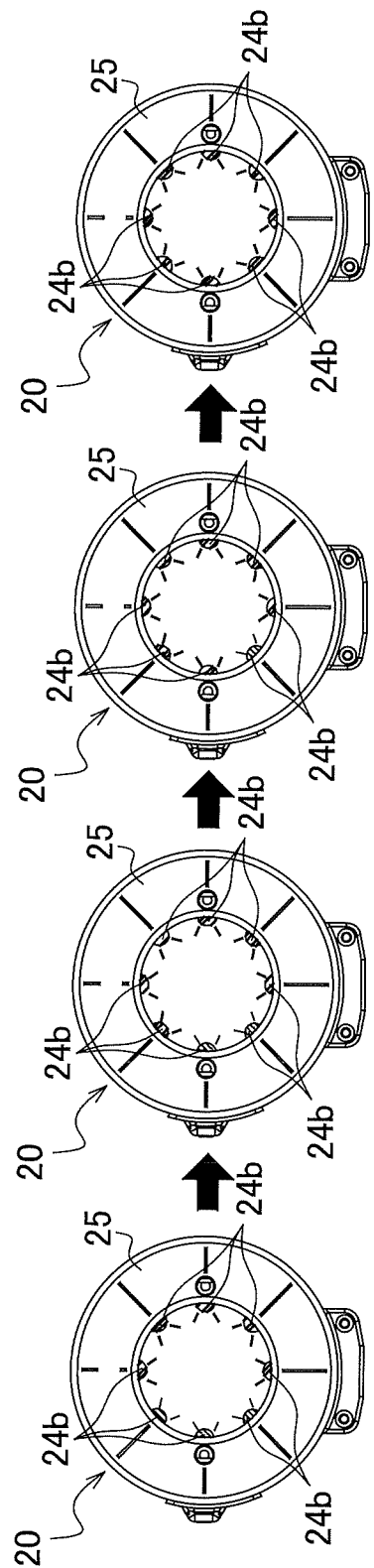

HANDHELD POWER TOOL, AND WORKING METHOD USING HANDHELD POWER TOOL AND WORKING PROGRAM

CROSS-REFERENCE TO RELATED APPLICATIONS

This application claims priority to Japanese Patent Application No. 2020-209563 filed on Dec. 17, 2020. The entire disclosure of Japanese Patent Application No. 2020-209563 is hereby incorporated herein by reference.

BACKGROUND

Technical Field

The present invention relates, for example, to a handheld power tool that performs various kinds of work while detect rebar or other such metal contained in concrete, and to a working method using the handheld power tool and a working program.

Description of the Related Art

In recent years, a metal detector that detects the position of rebar or other such metal has been used in order to perform drilling or the like in concrete while avoiding buried objects such as rebar contained in concrete, for example.

Conventionally, a metal detector such as this has been used to detect rebar inside concrete, and the detection results were marked so that drilling could be performed, using a handheld power tool such as a hammer drill, in the concrete while avoiding the positions where the rebar was buried.

However, in work with a handheld power tool at a work site where there is a large quantity of rebar, such as a solid foundation or concrete blocks, complicated marking is sometimes not performed when performing continuous drilling work such as anchoring or coring.

In this case, a problem was that the drill would come into contact with the rebar in the concrete during work with the handheld power tool, resulting in damage to the drill, etc.

For example, Patent Literature 1 discloses a power tool with a built-in metal detector, wherein, when drilling a hole in a concrete surface, if the drill comes into contact with a metal water pipe embedded in the concrete, an induced current is generated in an electric circuit to light a lamp and generate a buzzer sound.

CITATION LIST

Patent Literature

Patent Literature 1: JP-A 2000-308980

SUMMARY

However, the following problem is encountered with the above-mentioned conventional power tool having a built-in metal detector.

With the power tool disclosed in the above publication, since the operator is notified by lighting a lamp, generating a buzzer sound, etc., after making contact with the metal in the concrete, this can lead to problems such as damage to the drill or other such tip tool that comes into contact with the metal, or injury to the operator's wrist caused by impact upon contact with the metal.

It is an object of the present invention to provide a handheld power tool capable of notifying an operator of the presence or absence of metal without making contact with the metal located inside a target such as concrete, as well as a working method that make use of this handheld power tool and a working program.

The handheld power tool according to the first invention is a handheld power tool that detects metal contained in a target and performs work on the target, comprising a detection signal acquisition unit, a determination unit, a display unit, a display control unit, a drive unit, and a drive control unit. The detection signal acquisition unit acquires a detection signal that changes according to the detection intensity of the metal in the target. The determination unit determines the presence or absence of metal on the basis of the acquisition result acquired by the detection signal acquisition unit. The display unit displays the presence or absence of metal by turning on different lights. The display control unit controls so as to switch the color of the light displayed on the display unit on the basis of the determination result by the determination unit. The drive unit rotationally drives a tip tool that performs work on a target. The drive control unit controls the drive of the drive unit.

Here, for example, it is a handheld power tool that drives a tip tool such as a drill to make a hole in a target such as concrete, and functions as a metal detector that detects rebar or other such metal contained in concrete or another such target, and displays the detection result.

Here, examples of the handheld power tool include power tools that perform various kinds of work on concrete or another such target while being held by an operator, such as a hammer drill, an impact drill, and a vibrating drill.

Examples of targets include concrete used at a construction site such as an apartment building, a high-rise building, or a factory, a wall made of drywall, etc., and the like.

Also, the metal to be detected includes, for example, rebar contained in reinforced concrete, and metal such as aluminum or stainless steel installed in a wall.

Metal detection includes, for example, an induction type that detects the impedance of a detection coil which changes due to an eddy current generated in the metal when the metal (what is to be detected) approaches the magnetic field generated by passing a current through the detection coil; a capacitance type that detects a change in capacitance that occurs between the metal to be detected and another material; and a high-frequency oscillation type that detects a non-ferrous metal such as aluminum.

Examples of display control according to the presence or absence of metal include giving a display with lamps that emit a plurality of colors of light, such as lighting a lamp in red when it is determined that metal is nearby, lighting a lamp in green when it is determined that metal is not nearby, and lighting a lamp in yellow for a determination that is in between the above two.

Consequently, when drilling a hole in concrete or another such target with a handheld power tool, the presence or absence of metal is detected in a state in which the handheld power tool has been brought into contact with the surface of the target, and the detection result is displayed on the display unit, so that the operator can work on the target while keeping an eye on the color of the light on the display unit on which the detection result is displayed, and recognizing the position of the metal.

As a result, there is no need to perform marking, and the operator can be notified of the presence or absence of metal without coming into contact with the metal located inside the concrete or other such target, and the target can be subjected to various kinds of work.

The handheld power tool according to the second invention is the handheld power tool according to the first invention, wherein the drive control unit prohibits the drive of the drive unit when the determination unit has determined that the metal is present.

Consequently, if the determination unit determines that there is metal, this determination result can be reflected in the drive control of the drive unit to prohibit drive.

This avoids problems such as when the tip of the drill comes into contact with metal in the course of drilling or the like even though it has been determined that there is metal present, which further improves safety.

The handheld power tool according to the third invention is the handheld power tool according to the first or second invention, wherein the drive control unit permits the drive of the drive unit when the determination unit has determined that the metal is absent.

Consequently, if the determination unit determines that there is no metal, this determination result can be reflected in the drive control of the drive unit to allow drive.

This permits drilling or the like only when it is determined that there is no metal, thereby avoiding problems such as the tip of the drill coming into contact with the metal, and further improving safety.

The handheld power tool according to the fourth invention is a handheld power tool according to any of the first to third inventions, wherein the display control unit controls the display unit so as to emit auxiliary light that illuminates the portion to be worked by the tip tool while the drive unit is being driven.

Consequently, when performing actual work after the determination result for the presence or absence of metal from the determination unit has been displayed on the display unit, the light on the display unit can be used as auxiliary light that illuminates the portion being worked.

The handheld power tool according to the fifth invention is the handheld power tool according to the fourth invention, wherein the display control unit controls the display unit so as to emit white light as the auxiliary light.

Consequently, the light emitted from the display unit can illuminate the worked portion in white light, allowing the work to be carried out in a brightly lit state.

The handheld power tool according to the sixth invention is the handheld power tool according to any of the first to fifth inventions, wherein the determination unit determines the presence or absence of the metal by comparing the acquisition result acquired by the detection signal acquisition unit with a specific threshold value.

Consequently, the determination unit can determine the presence or absence of metal by comparing the acquisition result of the detection signal acquisition unit with a specific threshold value.

The handheld power tool according to the seventh invention is a handheld power tool according to any of the first to sixth inventions, further comprising a main body that includes the drive unit and the drive control unit, an orientation sensing unit that that senses the orientation of the main body, and an initialization processing unit that initializes the result acquired by the detection signal acquisition unit when the orientation sensing unit has sensed that the main body is in a specific orientation.

Consequently, when the upward orientation of the handheld power tool is set as the specific orientation, for example, the result acquired by the detection signal acquisition unit is reset (initialized) every time the operator turns the handheld power tool to face upward.

Therefore, initialization processing can be performed simply by putting the handheld power tool in a specific orientation, without having to operate a reset switch or the like every time the work site changes, and this makes the tool more usable for the operator.

The handheld power tool according to the eighth invention is the handheld power tool according to any of the first to seventh inventions, further comprising a metal detector that includes the detection signal acquisition unit, the display unit, and the display control unit, a main body that has a distal end part to which the metal detector is attached, and a contact portion that is provided to the distal end part of the main body and comes into contact with the target. The contact portion has a roller portion that rotates along the movement direction of the main body in a state of being in contact with the target.

Consequently, when the metal detector is brought into contact with concrete or another such target, since a roller is provided to the contact portion, metal detection scanning can be performed while easily moving the handheld power tool over the surface of the target as the roller rotates.

The handheld power tool according to the ninth invention is the handheld power tool according to any of the first to seventh inventions, further comprising a metal detector that includes the detection signal acquisition unit, the display unit, and the display control unit, a main body that has a distal end part to which the metal detector is attached, and a contact portion that is provided to the distal end part of the main body and comes into contact with the target. The contact portion has a friction reducing portion that reduces the friction with the target.

Here, the friction reducing portion includes, for example, a portion having a surface treatment for reducing friction generated with a target such as concrete, a shape having a reduced contact area, and the like.

Consequently, when the metal detector is brought into contact with concrete or another such target, the surface of the target can be scanned while the handheld power tool is easily moved over the surface of the target.

The handheld power tool according to the tenth invention is the handheld power tool according to any of the first to ninth inventions, further comprising a contact detection unit that detects contact with the target.

Consequently, detecting that the handheld power tool has come into contact with the concrete or other target makes it possible to perform control such as prohibiting the drive of the drive unit unless the handheld power tool is in contact with the target.

The handheld power tool according to the eleventh invention is the handheld power tool according to the tenth invention, wherein the contact detection unit is a contact switch that changes from an OFF state to an ON state upon coming into contact with the target.

This allows contact between the handheld power tool and the target to be detected with an inexpensive configuration by using a pressing-type contact switch as the contact detecting unit, for example.

The handheld power tool according to the twelfth invention is the handheld power tool according to the tenth or eleventh invention, further comprising a metal detector that includes a detection signal acquisition unit, a display unit, and a display control unit, a main body that has a distal end part to which the metal detector is attached, and a retracting mechanism for retracting the metal detector from the distal end part of the main body when the contact detection unit has detected contact with the target.

Consequently, when it is detected that the handheld power tool has come into contact with the target, the metal detector is automatically retracted from the distal end part of the main body, which makes it easier for the operator to see the part being worked on and also makes it less likely that dust and the like generated when the drill or other such tip tool is rotated to make a hole, for example, from clinging to the metal detector.

The handheld power tool according to the thirteenth invention is the handheld power tool according to any of the first to twelfth inventions, further comprising a metal detector that includes the detection signal acquisition unit, the display unit, and the display control unit, a main body that has a distal end part to which the metal detector is attached, and a dust collecting unit that draws in the outside air around the distal end part of the main body.

Consequently, providing a dust collecting portion to the distal end part of the main body helps keep the work site clean by drawing in the dust and the like generated during drilling and so forth.

The handheld power tool according to the fourteenth invention is the handheld power tool according to the thirteenth invention, wherein the dust collecting unit can be removed from the main body.

Consequently, since the dust collecting unit is removably attached to the main body, the handheld power tool can be used without the dust collecting unit when performing work that does not produce dust, at work sites where there is no problem even if dust is produced, and in other such work.

The handheld power tool according to the fifteenth invention is the handheld power tool according to any of the first to fourteenth inventions, further comprising a metal detector that includes the detection signal acquisition unit, the display unit, and the display control unit, and a main body that has a distal end part to which the metal detector is attached. The metal detector is removably attached to the main body.

Consequently, the handheld power tool can be used in a state in which the metal detector mounted on the handheld power tool can be attached to or removed from the main body, so the metal detector can be attached or detached and used as needed.

The working method using a handheld power tool according to the sixteenth invention is a working method that makes use of a handheld power tool that detects metal contained in a target and performs work on the target, the method comprising a detection signal acquisition step, a determination step, a display control step, and a drive step. In the detection signal acquisition step, the detection signal acquisition unit of the handheld power tool acquires a detection signal that changes according to the detection intensity of the metal in the target. In the determination step, the determination unit of the handheld power tool determines the presence or absence of metal on the basis of the acquisition result acquired by the detection signal acquisition unit. In the display control step, the display control unit of the handheld power tool controls so as to switch the color of the light displayed on the display unit on the basis of the determination result by the determination unit. In the drive step, the drive control unit of the handheld power tool controls the drive of the drive unit, which is provided with a tip tool for working the target.

Here, for example, it is a working method that makes use of a handheld power tool that drives a tip tool such as a drill to make a hole in a target such as concrete, wherein the handheld power tool includes the function of a metal detector that detects rebar or other such metal contained in concrete and displays the detection result.

Here, examples of the handheld power tool include power tools that perform various kinds of work on concrete or another such target while being held by an operator, such as a hammer drill, an impact drill, and a vibrating drill.

Examples of targets include concrete used at a construction site such as an apartment building, a high-rise building, or a factory, a wall made of drywall, etc., and the like.

Also, the metal to be detected includes, for example, rebar contained in reinforced concrete, and metal such as aluminum or stainless steel installed in a wall.

Metal detection includes, for example, an induction type that detects the impedance of a detection coil which changes due to an eddy current generated in the metal when the metal (what is to be detected) approaches the magnetic field generated by passing a current through the detection coil; a capacitance type that detects a change in capacitance that occurs between the metal to be detected and another material; and a high-frequency oscillation type that detects a non-ferrous metal such as aluminum.

Examples of display control according to the presence or absence of metal include giving a display with lamps that emit a plurality of colors of light, such as lighting a lamp in red when it is determined that metal is nearby, lighting a lamp in green when it is determined that metal is not nearby, and lighting a lamp in yellow for a determination that is in between the above two.

Consequently, when drilling a hole in concrete or another such target with a handheld power tool, the presence or absence of metal is detected in a state in which the handheld power tool has been brought into contact with the surface of the target, and the detection result is displayed on the display unit, so that the operator can work on the target while keeping an eye on the color of the light on the display unit on which the detection result is displayed, and recognizing the position of the metal.

As a result, there is no need to perform marking, and the operator can be notified of the presence or absence of metal without coming into contact with the metal located inside the concrete or other such target, and the target can be subjected to various kinds of work.

The working program according to the seventeenth invention causes a computer to execute a working method that makes use of a handheld power tool, in which work on the target is performed while detecting metal contained in a target, the method comprising a detection signal acquisition step, a determination step, a display control step, and a drive step. In the detection signal acquisition step, a detection signal acquisition unit of the handheld power tool acquires a detection signal that changes according to the detection strength of the metal in the target. In the determination step, a determination unit of the handheld power tool determines the presence or absence of the metal on the basis of the acquisition result acquired by the detection signal acquisition unit. In the display control step, a display control unit of the handheld power tool controls so as to switch the color of the light displayed on the display unit on the basis of the determination result by the determination unit. In the drive step, a drive control unit of the handheld power tool controls the drive of the drive unit to which a tip tool for working the target is mounted.

Here, for example, it is a metal detection program that makes use of a handheld power tool that drives a tip tool such as a drill to make a hole in a target such as concrete, wherein the handheld power tool has the function of a metal detector that detects metal such as rebar contained in concrete or another such target, and displays this detection result.

Here, examples of handheld power tools include power tools that perform various kinds of work on concrete or another such target while being held by an operator, such as a hammer drill, an impact drill, and a vibrating drill.

Examples of targets include concrete used at a construction site such as an apartment building, a high-rise building, or a factory, a wall made of drywall, etc., and the like.

Also, the metal to be detected includes, for example, rebar contained in reinforced concrete, and metal such as aluminum or stainless steel installed in a wall.

Metal detection includes, for example, an induction type that detects the impedance of a detection coil which changes due to an eddy current generated in the metal when the metal (what is to be detected) approaches the magnetic field generated by passing a current through the detection coil; a capacitance type that detects a change in capacitance that occurs between the metal to be detected and another material; and a high-frequency oscillation type that detects a non-ferrous metal such as aluminum.

Examples of display control according to the presence or absence of metal include giving a display with lamps that emit a plurality of colors of light, such as lighting a lamp in red when it is determined that metal is nearby, lighting a lamp in green when it is determined that metal is not nearby, and lighting a lamp in yellow for a determination that is in between the above two.

Consequently, when drilling a hole in concrete or another such target with a handheld power tool, the presence or absence of metal is detected in a state in which the handheld power tool has been brought into contact with the surface of the target, and the detection result is displayed on the display unit, so that the operator can work on the target while keeping an eye on the color of the light on the display unit on which the detection result is displayed, and recognizing the position of the metal.

As a result, there is no need to perform marking, and the operator can be notified of the presence or absence of metal without coming into contact with the metal located inside the concrete or other such target, and the target can be subjected to various kinds of work.

Effects

The metal detector according to the present invention allows an operator to be notified of the presence or absence of metal located inside concrete or another such target without coming into contact with the metal.

BRIEF DESCRIPTION OF THE DRAWINGS

FIGS. 10A to 10F are diagrams showing control for displaying different colors of light on the display unit of the metal detector in FIG. 6 according to the determination result indicating the presence or absence of metal;

FIGS. 11A to 11H are diagrams showing control for displaying different colors of light on the display unit of the metal detector in FIG. 6 according to the determination result indicating the presence or absence of metal;

FIGS. 12A to 12D are diagrams showing control for displaying different colors of light on the display unit of the metal detector in FIG. 6 according to the determination result indicating the presence or absence of metal;

DETAILED DESCRIPTION

Embodiment 1

A handheld power tool 10 including a metal detector 20 according to an embodiment of the present invention will now be described with reference to FIGS. 1 to 15.

In the following description, the distal end side means the side on which a tip tool 18a for machining with the handheld power tool 10 is mounted, and the rear end side means the opposite side from the distal end side.

Figure 1:
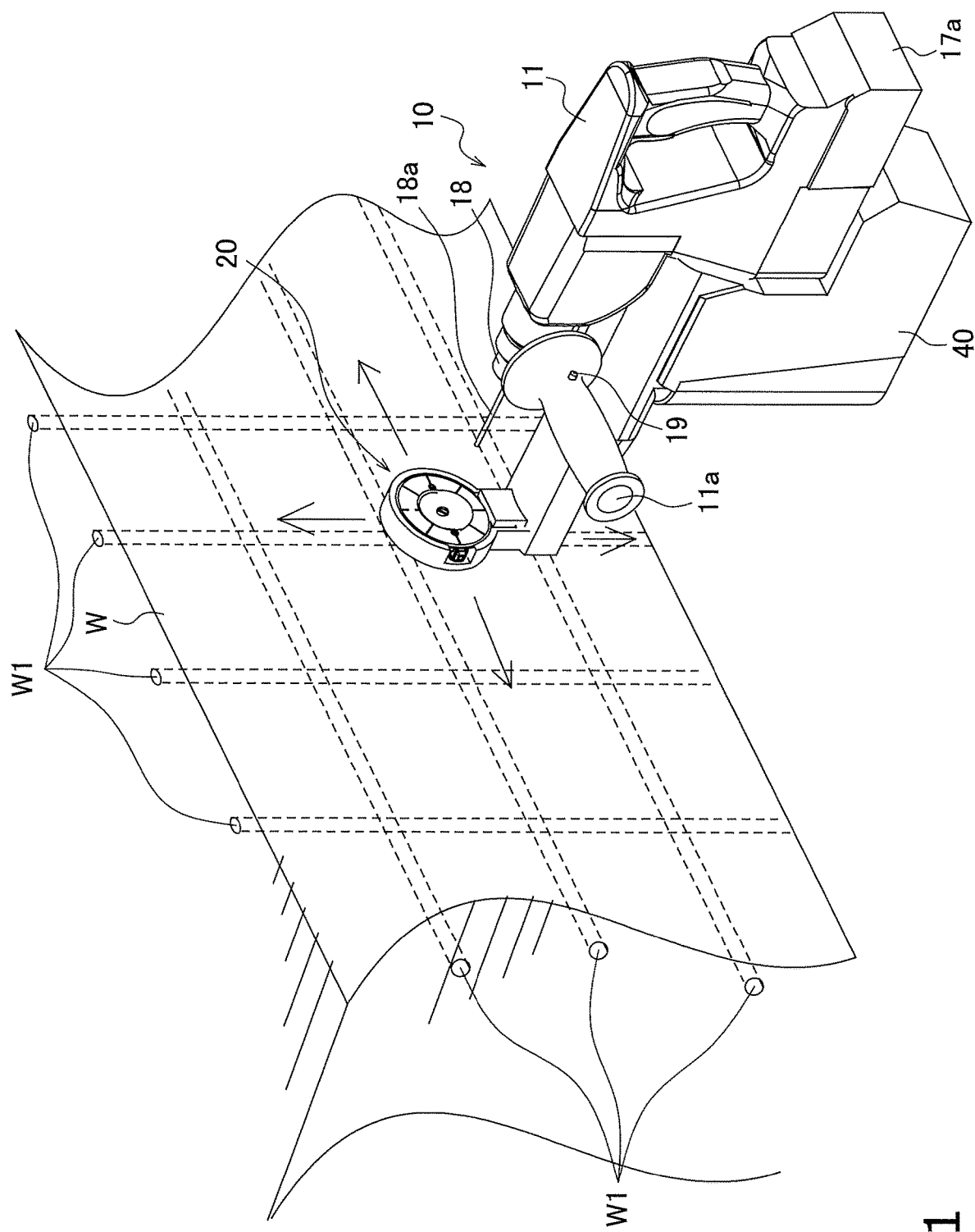
FIG. 1 is an oblique view of a state in which concrete is worked with a handheld power tool equipped with the metal detector according to an embodiment of the present invention, while the presence or absence of rebar is detected.

As shown in FIG. 1, the handheld power tool 10 according to this embodiment is, for example, a hammer drill (a type of handheld power tool) for performing work while the position of rebar (metal) embedded in the concrete (target) W is detected in a state in which the tool is being held by the operator, the metal detector 20 is integrally attached on the tip portion 18 side to which a tip tool 18a such as a drill has been mounted.

As shown in FIG. 1, the handheld power tool 10 moves the metal detector 20 over the surface of the concrete W, and when the position where the rebar W1 is embedded is approached, the operator is notified of the presence or absence of the rebar W1 by changing the color of the light that appears on a display unit 24 (see FIG. 6 and the like; discussed below).

Consequently, the operator can recognize the presence or absence of the rebar W1 by looking at the color of the light on the display unit 24. This allows drilling or other such work to be performed on the concrete W with the handheld power tool 10 while avoiding contact of the tip tool 18a with the rebar W1.

In this embodiment, an example is given in which a plurality of rebars W1 are embedded in the concrete W in a grid pattern, but the number, thickness, length, etc., of the rebar W1 are not limited to what is shown in FIG. 1.

Here, first, the outward configuration of the handheld power tool 10 will be described with reference to FIGS. 2 to 5.

Figure 2:
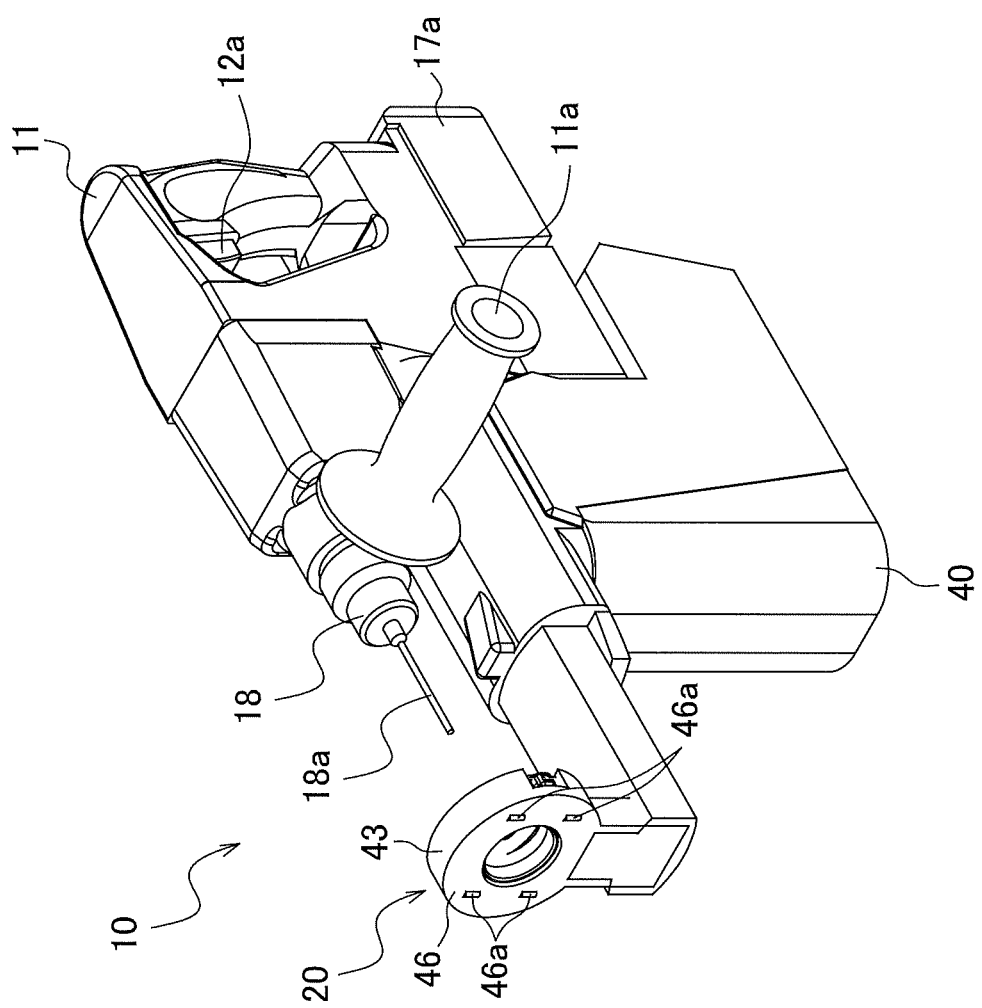
FIG. 2 is an overall oblique view of the configuration of the handheld power tool in FIG. 1.
Figure 3:
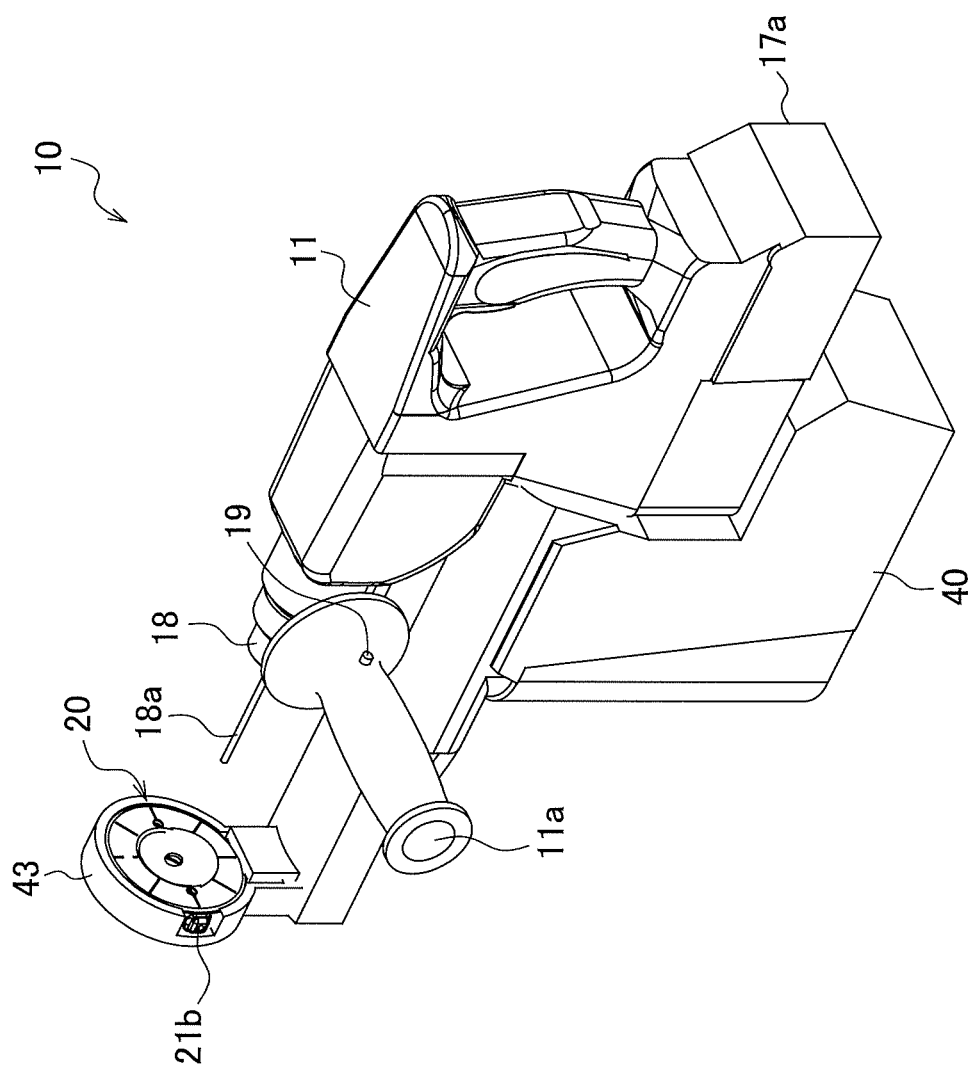
FIG. 3 is an overall oblique view of the configuration of the handheld power tool in FIG. 2.

As shown in FIGS. 2 and 3, the handheld power tool 10 includes a main body 11, the metal detector 20, and a dust collecting unit 40.

The main body 11 has a grip portion 11a that is gripped by an operator during work, a trigger switch 12a that rotationally drives a motor (drive unit) 14 (see FIG. 8) when gripped by the operator, a battery 17a that supplies the electric power for the handheld power tool 10, and a tip portion 18 that is disposed on the side that does the work on the concrete W.

As shown in FIGS. 2 and 3, the grip portion 11a is provided so as to project from the left side surface of the main body 11, and is gripped by the left hand of the operator when performing work with the handheld power tool 10.

The grip portion 11a may be attached to the operator on the opposite side depending on the dominant hand of the operator.

Also, as shown in FIG. 3, a reset switch 19, which is pressed when the metal detector 20 is manually initialized, is provided on the front of the grip portion 11a.

As shown in FIG. 2, the trigger switch 12a is provided on the opposite side from the tip portion 18 (the rear end side) of the main body 11, and when the tip tool 18a is rotated to perform the work, this switch is gripped by the operator.

The battery 17a is a rechargeable secondary battery that supplies power to the components included in the handheld power tool 10, and is attached, so as to be replaceable, at the lower portion of the main body 11 on the rear end side, as shown in FIGS. 2 and 3.

As shown in FIGS. 2 and 3, the tip portion 18 is provided on the side of the main body 11 closer to the concrete W during work, and a tip tool 18a such as a drill is attached to the tip portion 18. The tip portion 18 is rotationally driven along with the tip tool 18a by controlling the rotational drive of the motor 14 according to how much the trigger switch 12a is operated.

Figure 4:
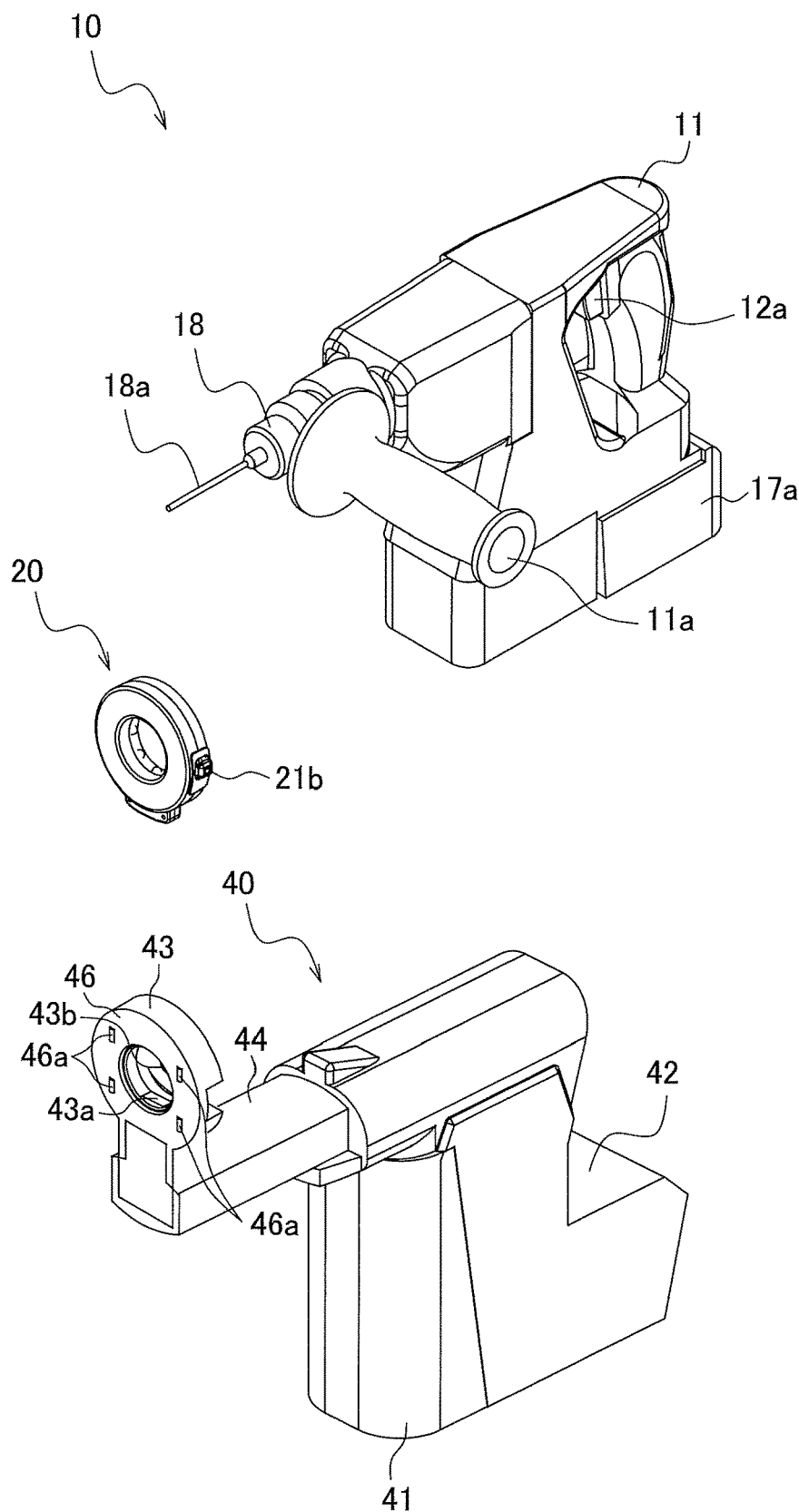
FIG. 4 is an exploded oblique view of the handheld power tool in FIG. 2.
Figure 5:
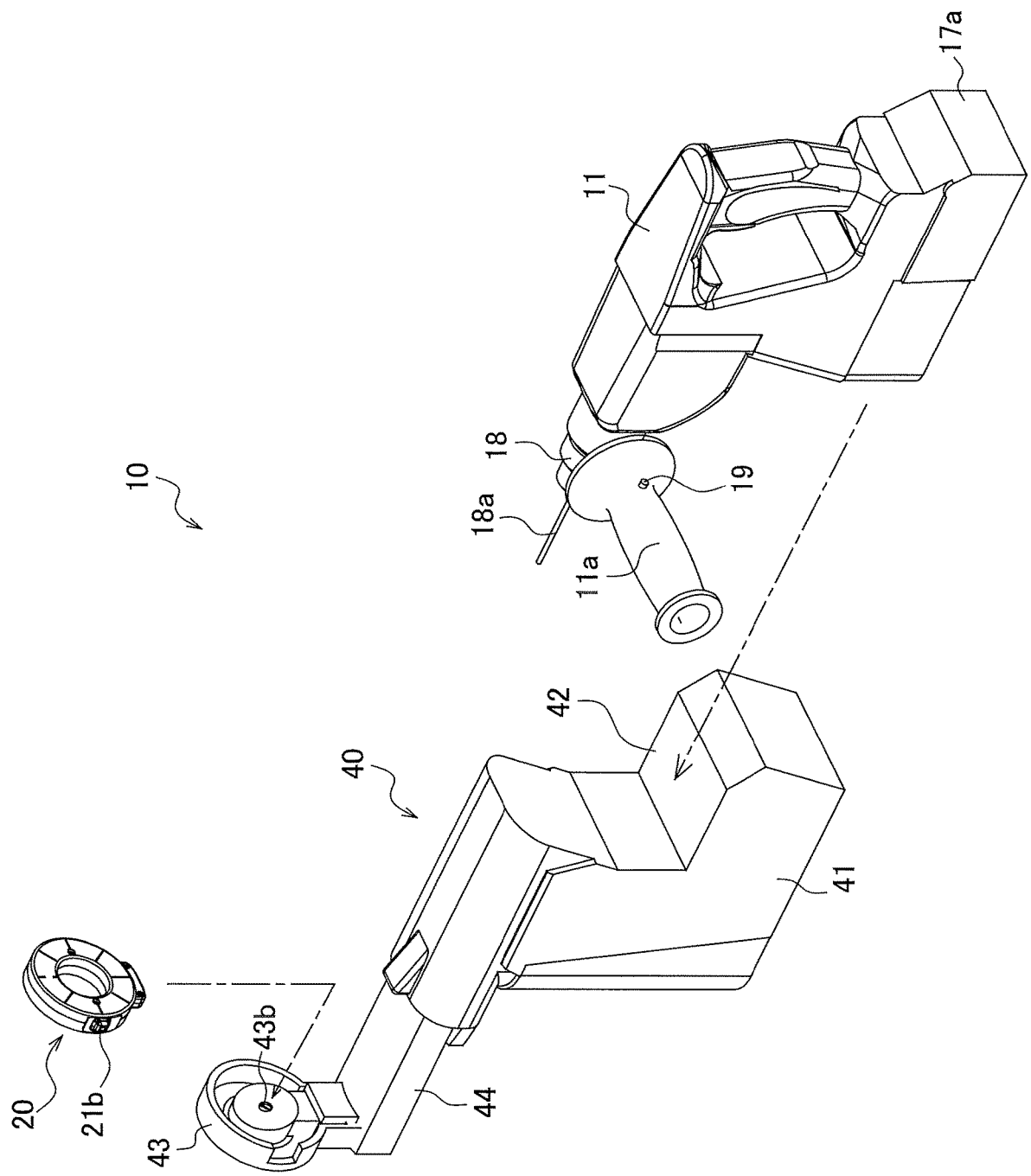
FIG. 5 is an exploded oblique view of the handheld power tool in FIG. 3.

The metal detector 20 is attached in an integrated state on the distal end side of the main body 11 of the handheld power tool 10 in order to detect the presence or absence of the rebar W1 in the concrete W on which work such as drilling is to be performed with the handheld power tool 10. As shown in FIGS. 4 and 5, the metal detector 20 is removably attached to a recess formed on the rear end side of a detector attachment unit 43 of the dust collecting unit 40.

The metal detector 20 has a substantially annular shape, and a work hole, into which the tip tool 18a such as a drill is inserted during machining, is provided in the central portion thereof.

The configuration of the metal detector 20 will be described in detail below.

The dust collecting unit 40 is provided for sucking up the dust of the concrete W produced when the tip tool 18a such as a drill is rotationally driven to drill a hole in the concrete W, for example. More specifically, dust and the like are sucked up through a suction port 43a provided to the detector attachment unit 43, which is where the metal detector 20 is mounted at a position on the distal end side of the handheld power tool 10.

As shown in FIGS. 4 and 5, the dust collecting unit 40 is removably attached to the lower part of the main body 11 of the handheld power tool 10, and has a main body 41, a mounting unit 42, the detector attachment unit 43, and an arm portion 44.

The main body 41 has a boxy shape including a suction mechanism (not shown) inside, and a space is formed for collecting dust and the like sucked in through the suction port 43a via the arm portion 44. The main body 41 is provided with the detector attachment unit 43 and the arm portion 44 on the front end side where work is performed, and with the mounting unit 42 on the rear end side.

As shown in FIG. 5, the mounting unit 42 is the portion of the handheld power tool 10 to which the main body 11 is mounted, and is fixed in a state of being engaged with the main body 11.

As shown in FIGS. 4 and 5, the detector attachment unit 43 is a substantially annular portion provided at the distal end of the arm portion 44 provided on the distal end side of the main body 41 of the dust collecting unit 40, and the metal detector 20 is attached from the rear end side. The detector attachment unit 43 has the suction port 43a formed in the inner peripheral surface of a substantially annular portion.

The detector attachment unit 43 also has an opening 43b, which serves as a work hole into which the tip tool 18a such as a drill is inserted, in the central portion of the substantially annular ring.

Furthermore, a contact surface 46 (see FIG. 2), which comes into contact with the concrete W during the work of detecting the rebar W1 with the metal detector 20, is formed on the distal end side of the detector attachment unit 43.

As shown in FIG. 2, four rollers 46a are rotatably attached to the contact surface 46 so as to surround the central opening (work hole) of the detector attachment unit 43.

Consequently, the metal detector 20 can be smoothly moved in the scanning direction (for example, the lateral direction) in a state in which the contact surface 46 is in contact with the surface of the concrete W. This allows metal detection to be performed while moving the metal detector 20 (handheld power tool 10) in the desired scanning direction without producing frictional resistance between the surface of the concrete W and the contact surface 46.

The arm portion 44 is a member that is hollow inside, and guides dust and the like sucked up through the suction port 43a of the detector attachment unit 43 provided on the distal end side into the main body 41. Also, the arm portion 44 is attached to the main body 41 in a state that allows its movement forward and backward.

This allows the length of the arm portion 44 to be adjusted such that the length will be appropriate for the length of the tip tool 18a mounted on the tip portion 18, for example. Also, when only the work of detecting the presence or absence of the rebar W1 with the metal detector 20 is performed before drilling or other such work, or when the tip tool 18a is attached to or detached from the tip portion 18, etc., the work of detecting the rebar W1 and the work of replacing the tip tool 18a can be performed more easily by pulling out the arm portion 44 from the main body 41.

Next, the configuration of the metal detector 20 will be described with reference to FIG. 6.

Figure 6:
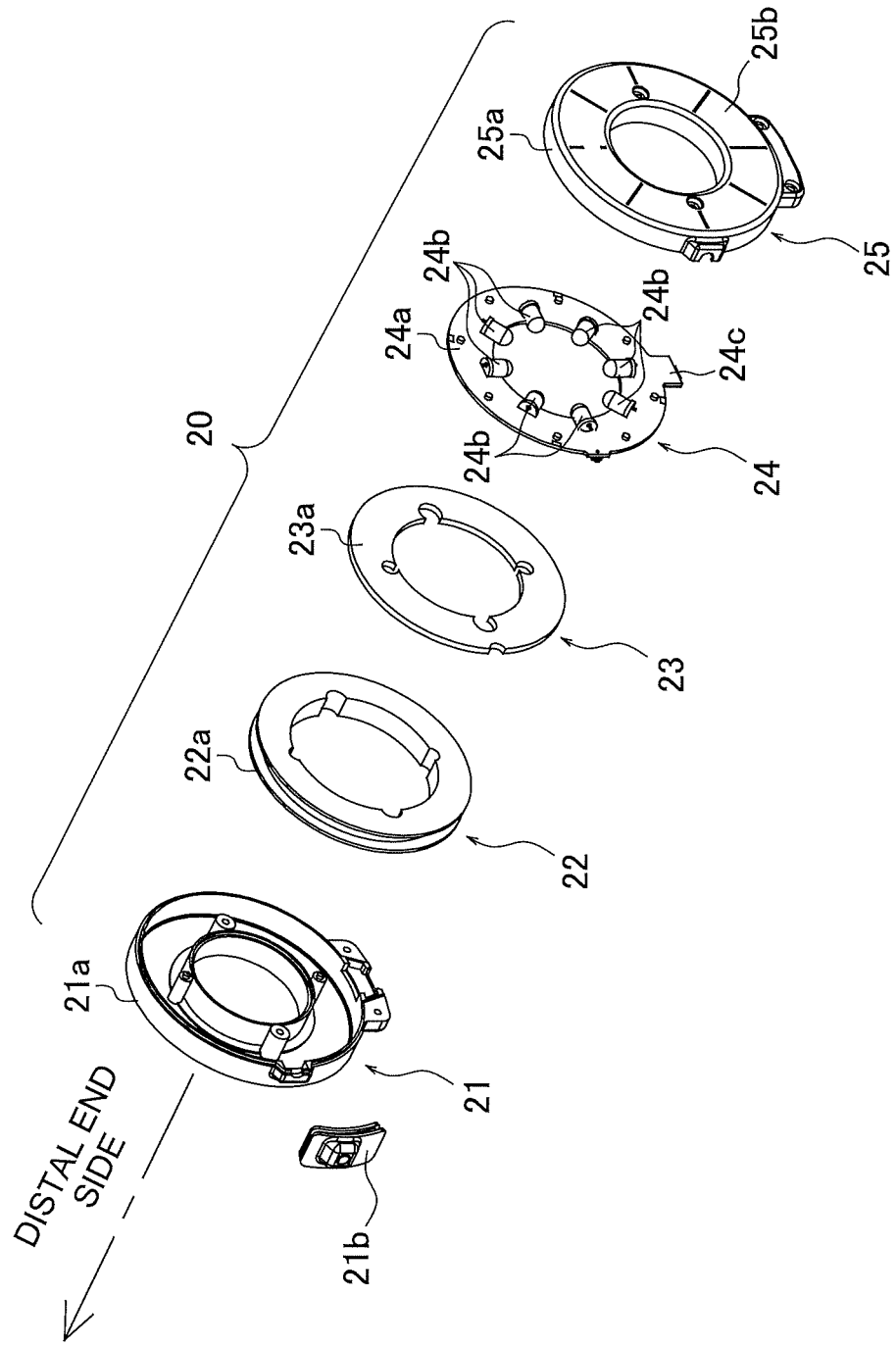
FIG. 6 is an exploded oblique view of the configuration of the metal detector provided to the handheld power tool in FIG. 2, etc.

As shown in FIG. 6, the metal detector 20 has a substantially annular shape, and has a case (mounting unit) 21, a detector unit 22, a spacer 23, a display unit 24, and a cover 25.

As shown in FIG. 5, the case (mounting unit) 21 is disposed on the side where the metal detector 20 is mounted in the recess of the detector attachment unit 43. As shown in FIG. 6, the case 21 is a substantially annular member disposed on the most distal end side among the members constituting the metal detector 20, and has a main body 21a and a switch cover 21b.

The main body 21a is a substantially annular member having an opening in the center, and includes the detector unit 22, the spacer 23, and the display unit 24 in a space formed between the main body 21a and the cover 25.

The switch cover 21b is, for example, a rubber member that is attached to the outer peripheral surface of the main body 21a, and forms a dust-proof and drip-proof structure that covers an initialization switch (not shown), etc., provided inside the main body 21a.

Then, when a portion of the switch cover 21b is pressed, the detection signal of the metal detector 20 can be initialized.

As shown in FIG. 6, the detector unit 22 has a substantially annular main body 22a and a coil 22b that is wound around the outer peripheral surface of the main body 22a. The detector unit 22 is an induction type that detects the rebar W1 by sensing the impedance of a coil, which changes due to the eddy current generated in the rebar W1 when the rebar W1 approaches the magnetic field formed when a current is passed through the coil 22b.

As shown in FIG. 6, the spacer 23 has a substantially annular main body 23a, and is provided between the detector unit 22 and the substrate 24a of the display unit 24.

Consequently, the spacer 23 can reduce the metal influence of the substrate 24a on the detector unit 22, and make it less likely that heat generated in the substrate 24a will be transferred to the detector unit 22.

As shown in FIG. 6, the display unit 24 has a substrate 24a, eight full-color LEDs (light emitting diodes) 24b, and a USB (universal serial bus) connector 24c. The eight full-color LEDs 24b are disposed on the substantially annular substrate 24a, facing toward the opening formed in the center of the substrate 24a. The LEDs 24b notify the operator of the detection result for the rebar W1 detected by the detector unit 22, by turning on lights of different colors (green, yellow, and red in this embodiment) according to the distance to the rebar W1.

For instance, if the distance to the rebar W1 is relatively long, the display unit 24 lights the LEDs 24b with green light. On the other hand, if the distance to the rebar W1 is relatively short, the display unit 24 lights the LEDs 24b with red light. Furthermore, if the distance to the rebar W1 is between when the green and red lights are lit, the display unit 24 causes the LEDs 24b to emit yellow light.

With the metal detector 20 in this embodiment, since the display unit 24 includes eight LEDs 24b, all eight LEDs 24b may be lit in the same lighting color, or the numbers of green, yellow, and red lights may be switched depending on the distance to the rebar W1.

Consequently, the operator can recognize the approximate distance to the rebar W1 by checking the color of the lights on the display unit 24 of the metal detector 20.

Furthermore, with the metal detector 20 in this embodiment, if it is determined that there is no rebar W1 as a result of detection by the detector unit 22, for example, it is detected that the trigger switch 12a has been operated after the LEDs 24b are lit in green, and the LEDs 24b are lit in white.

This white light is used as auxiliary light that brightly illuminates the position where work is to be performed when the trigger switch 12a is operated to rotate the motor 14 and the tip tool 18a is rotationally driven.

Consequently, the display unit 24 can not only show the detection result of the rebar W1 but also turn on an auxiliary light that brightly illuminates the work position when the work is being performed.

A USB cable for connecting to an external device such as a battery is connected to the USB connector 24c. This allows the metal detector 20 to be used by itself by receiving power from the battery.

As shown in FIG. 6, the cover 25 is a substantially annular member that is disposed on the rearmost end side among the members constituting the metal detector 20, and together with the above-mentioned case 21, constitutes the outer shell of the metal detector 20. The cover 25 also has a main body 25a and a mode display surface 25b.

The main body 25a is a substantially annular member, and three LEDs used for mode notification (not shown) are mounted in the interior thereof.

The mode display surface 25b is a surface on the rear end side (operator side) of the main body 25a, and displays a plurality of metal detection modes (discussed below) by turning on lights of different colors.

Figure 7:
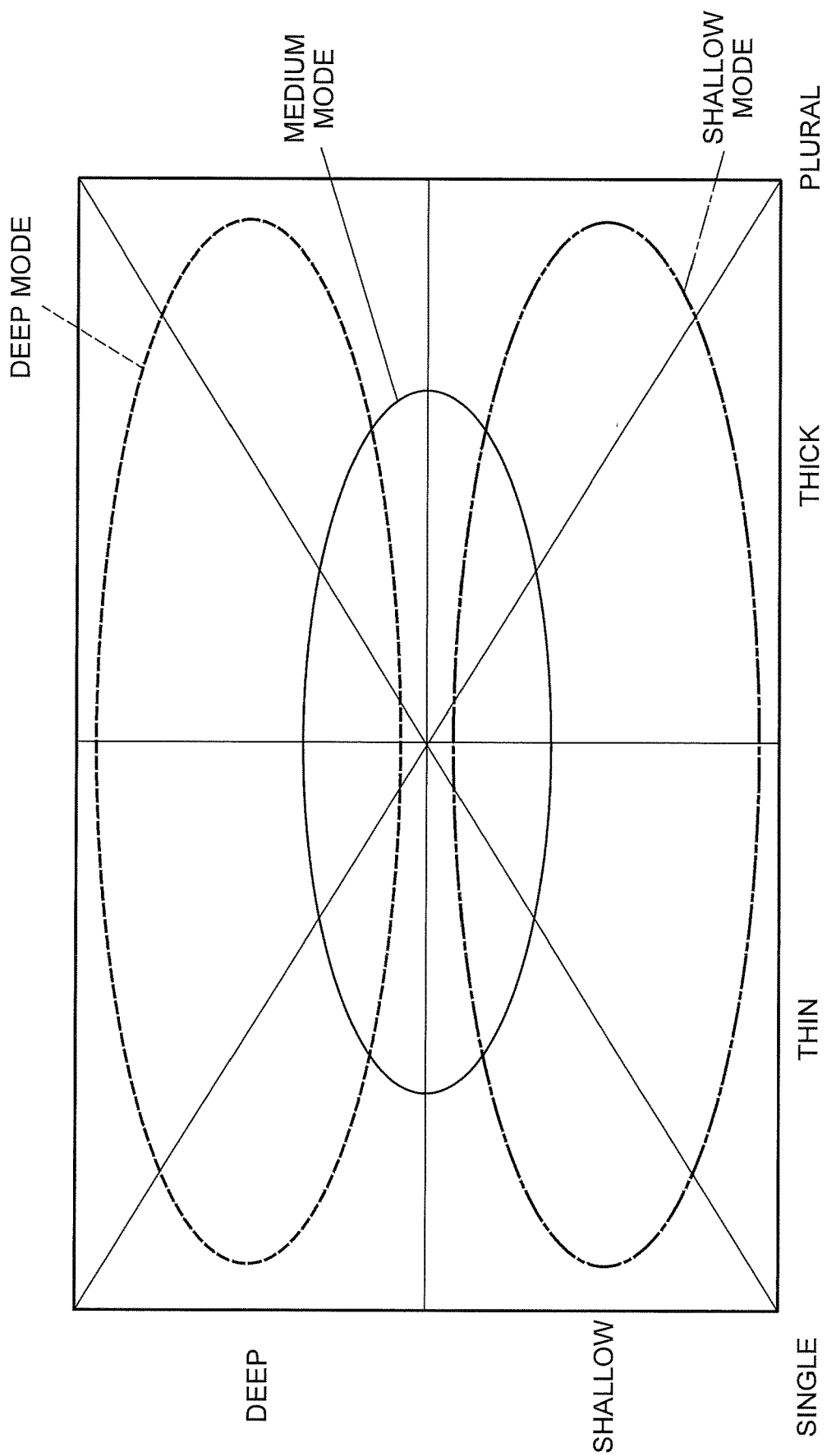
FIG. 7 is a graph of the metal detection modes that can be set in the handheld power tool in FIG. 2, etc.

Here, in this embodiment, as shown in FIG. 7, three metal detection modes (deep mode, medium mode, and shallow mode) selected in advance by the operator are set.

In the three metal detection modes, different threshold values for determination are set according to, for example, the depth at which the rebar W1 is thought to exist, the thickness of the rebar W1, the number of rebars, the spacing, and so forth, and the mode is selected by the operator. Switching between these three modes is performed with a mode switch (not shown).

Since a different threshold value is thus set for each mode, if the shallow mode is selected, for example, it is possible to improve the detection accuracy for the rebar W1 located at a relatively shallow depth from the surface of the concrete W. This allows a plurality of thick rebars W1 located at a relatively shallow depth from the surface of the concrete W to be detected with high accuracy, for example.

Also, when the deep mode is selected, the detection accuracy of the rebar W1 located at a relatively deep position from the surface of the concrete W can be improved. This allows for better accuracy in detecting thin rebar W1 located at a greater depth from the surface of the concrete W, for example.

The control blocks of the handheld power tool 10 will now be described with reference to FIG. 8.

As described above, the handheld power tool 10 includes the main body 11, the metal detector 20, and the dust collecting unit 40.

Figure 8:
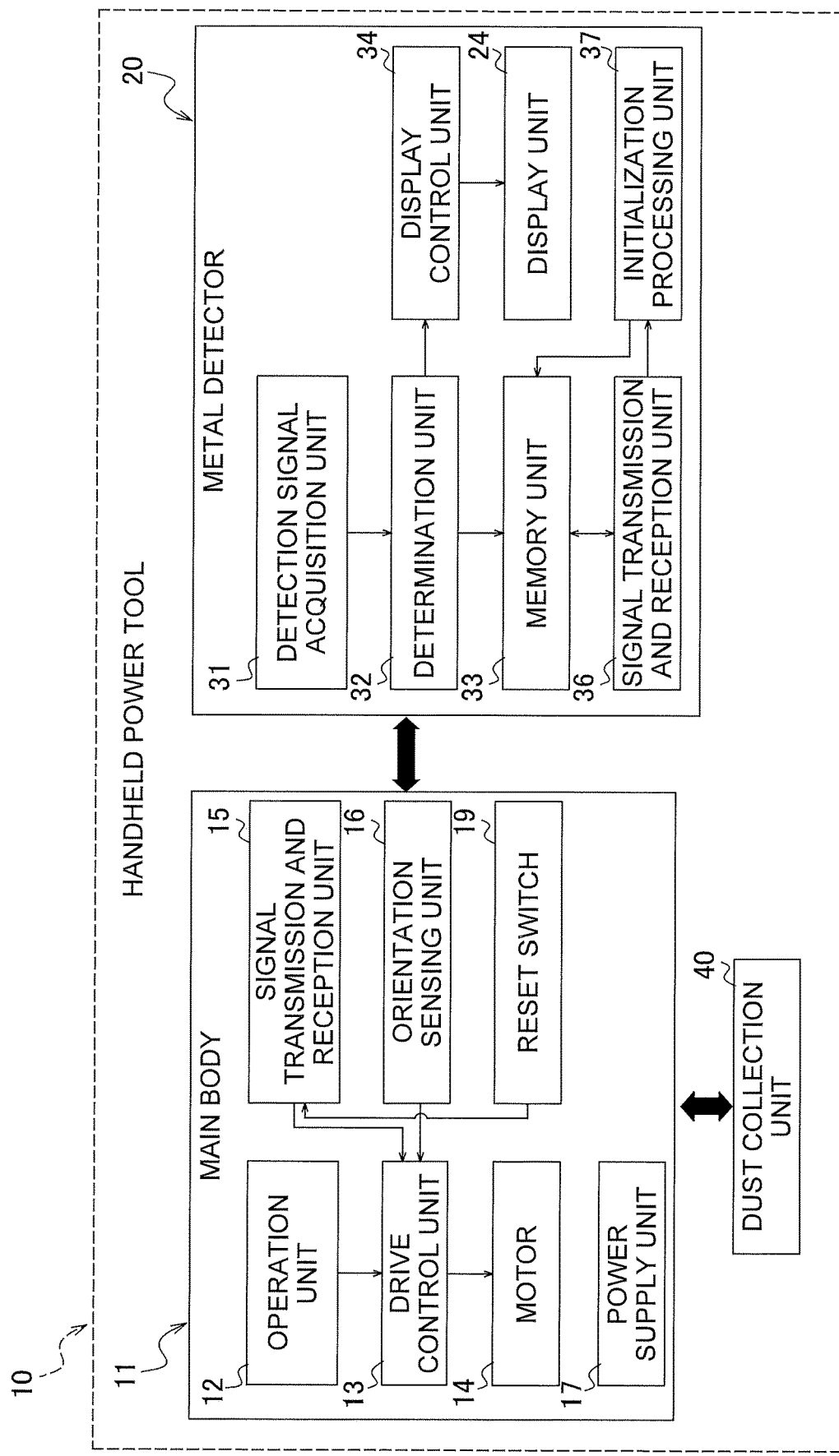
FIG. 8 is a control block diagram of the handheld power tool in FIG. 2, etc.

As shown in FIG. 8, the main body 11 has an operation unit 12, a drive control unit 13, a motor (drive unit) 14, a signal transmission and reception unit 15, an orientation sensing unit 16, a power supply unit 17, and a reset switch 19.

The operation unit 12 is connected to the trigger switch 12a of the handheld power tool 10, detects how much the trigger switch 12a has been operated, and transmits this amount to the drive control unit 13.

The drive control unit 13 controls the rotation speed of the motor 14 according to the operation amount of the trigger switch 12a received from the operation unit 12. Also, the drive control unit 13 receives a drive prohibition signal or a drive permission signal transmitted from the signal transmission and reception unit 36 according to the determination result by the determination unit 32 of the metal detector 20, and either prohibits or permits the drive of the motor 14.

The drive of the motor (drive unit) 14 is controlled by the drive control unit 13, and the tip portion 18 to which the tip tool 18a is mounted is rotationally driven to perform drilling or other such work on the surface of the concrete W.

The signal transmission and reception unit 15 can communicate with the signal transmission and reception unit 36 on the metal detector 20 side, receives the determination result or the like from the determination unit 32 of the metal detector 20, and transmits this result to the drive control unit 13. When the reset switch 19 provided on the main body 11 side is operated, or when the orientation sensing unit 16 senses that the handheld power tool 10 is in a predetermined orientation, the signal transmission and reception unit 15 sends an initialization signal for initializing the metal detector 20 to the metal detector 20 side.

The orientation sensing unit 16 is, for example, a gyro sensor provided for sensing that the handheld power tool 10 is in a predetermined orientation. The orientation sensing unit 16 senses, for example, that the handheld power tool 10 has moved from a lateral orientation to a vertical, upward-facing orientation.

With the handheld power tool 10 in this embodiment, the initialization process is automatically performed, for example, by sensing a specific orientation of the handheld power tool 10 in this way.

That is, the initialization processing for initializing the detection result from the metal detector 20 may be performed not only upon manual operation of the reset switch 19, but also when the orientation sensing unit 16 senses that the handheld power tool 10 is in a specific orientation.

Consequently, the operator does not have to manually press the reset switch 19 every time the place where metal is to be detected changes, for example, so the operator only needs to put the handheld power tool 10 in a specific orientation when initialization is to be performed, and the initialization processing can be automatically performed to detect the rebar W1 and perform work at a new location.

The power supply unit 17 supplies electric power from the above-mentioned rechargeable battery 17a, and also supplies power to the components inside the main body 11, to the components of the metal detector 20, and to the dust collecting unit 40.

The reset switch 19 is a manual switch that is provided at the base portion of the above-mentioned grip portion 11a and is pressed when the initialization processing of the metal detector 20 is performed. For example, this switch is operated by the thumb of the operator's left hand.

As shown in FIG. 8, the metal detector 20 has a detection signal acquisition unit 31, a determination unit 32, a memory unit 33, a display control unit 34, a display unit 24, a signal transmission and reception unit (prohibition signal transmission unit, permission signal transmission unit) 36, and an initialization processing unit 37.

The detection signal acquisition unit 31 acquires a detection signal indicating a change in the impedance of the coil 22b sensed by the detector unit 22 in FIG. 6.

The determination unit 32 determines the presence or absence of the rebar W1 or the approximate distance to the rebar W1 on the basis of the detection signal acquired by the detection signal acquisition unit 31.

Figure 9:
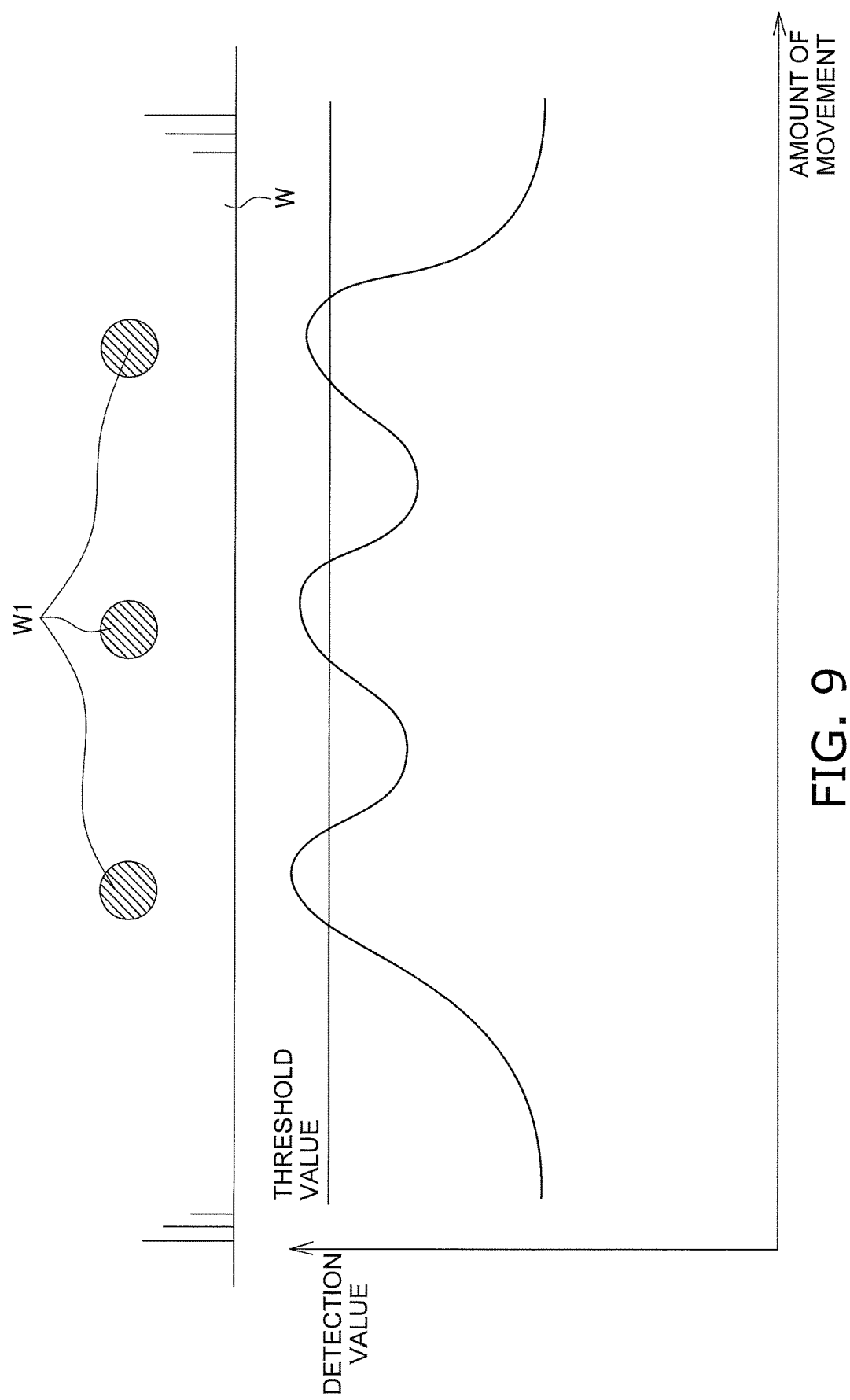
FIG. 9 is a diagram illustrating a metal detection method using the handheld power tool in FIG. 2, etc.

More specifically, as shown in FIG. 9, when the metal detector 20 is scanned from left to right in the drawing in order to detect the presence of absence of the rebar W1 embedded in the concrete W, for example, the determination unit 32 moves the detection value up and down along with the movement of the metal detector 20.

At this point, the determination unit 32 detects the presence or absence of the rebar W1 by using a determination threshold value set according to each of the above-mentioned modes.

For example, FIG. 9 shows a composite detection graph in which peaks of detected values appear continuously because of a plurality of rebars W1 embedded in the concrete W.

In the graph shown in FIG. 9, it is determined that the rebar W1 is present at the position where the detected value becomes larger than a specific threshold value.

The memory unit 33 stores the detection signal acquired by the detection signal acquisition unit 31, the determination result of the determination unit 32, and the like.

The display control unit 34 controls the display 24 so as to change the lighting colors of the eight LEDs 24b included in the above-mentioned display unit 24 on the basis of the determination result by the determination unit 32.

For example, the display control unit 34 lights the eight LEDs 24b in green in the initial state or when it is determined that there is no rebar W1, and as the rebar W1 is approached, the color of the light is changed from green to yellow to red, according to the distance to the rebar W1.

Furthermore, when no rebar W1 is detected and the trigger switch 12a is in its ON state, the display control unit 34 lights the eight LEDs 24b in white, so that the work surface of the concrete W is illuminated with white light to assist in the work.

More precisely, in the graph shown in FIG. 9, the display control unit 34 changes the lighting color of the LEDs 24b of the display unit 24 on the basis of the determination result by the determination unit 32, and this notifies the operator whether the current position is one where there is no rebar W1.

For example, FIGS. 10A to 12D show the control for switching the lighting color of the LEDs 24b of the display unit 24 according to the determination result by the determination unit 32.

That is, FIG. 10B shows the display in the initial state or when there is no rebar W1 nearby, and shows a state in which all eight of the LEDs 24b of the display unit 24 have been lit in green.

FIG. 10A shows a state in which white light is emitted for use during work after the initial state in FIG. 10B, etc.

From the initial state in FIG. 10B to FIGS. 10C to 10E, the lighting color of from one to three of the eight LEDs 24b is changed from green to yellow in order to notify the operator that the tool is moving closer to the rebar W1, but that this area is one in which drilling or other such work can still be performed.

More specifically, in the lighting state shown in FIG. 10C the one at the very bottom is yellow while the others are green, in the lighting state shown in FIG. 10D the one at the very bottom and the one to the right are yellow while the others are green, and in the lighting state shown in FIG. 10E the one at the very bottom and the two to the right are yellow while the others are green.

The operator can preset the lit areas shown in FIGS. 10B to 10E as areas in which drilling or other such work can be performed.

Next, FIG. 10F shows the state in which the rebar W1 is now closer and the lighting color of four of the eight LEDs 24b has changed from green to yellow (the one at the very bottom and the three to the right are yellow while the others are green).

Consequently, the operator can set the lit area shown in FIG. 10F as an area where work is not possible.

Similarly, FIGS. 11A to 11D show the state in which the rebar W1 is now even closer, and the lighting color ranges from when five of the eight LEDs 24b are yellow (the five from the very bottom to the very top are yellow while the rest are green), to when all eight of the LEDs 24b are yellow.

Consequently, the operator can similarly set the lit areas shown in FIGS. 11A to 11D as areas in which work is not possible.

As the rebar W1 approaches even nearer, as shown in FIGS. 11E to 11H, the lighting color of from one to three of the eight LEDs 24b changes from yellow to red.

More specifically, in the lighting state shown in FIG. 11E, the one at the very bottom is red while the others are yellow, in the lighting state shown in FIG. 11F, the one at the very bottom and the one to the right are red while the others are yellow, in the lighting state shown in FIG. 11G, the one at the very bottom and the two to the right are red while the others are yellow, and in the lighting state shown in FIG. 11H, the one at the very bottom and the three to the right are red while the others are yellow.

The operator can preset the areas in the lighting state shown in FIGS. 11E to 11H as areas where drilling or other such work is not possible.

As the rebar W1 approaches even nearer from here, as shown in FIGS. 12A to 12D, the lighting color of from five to all eight of the LEDs 24b changes from yellow to red.

Consequently, the operator can set the areas in the lighting states shown in FIGS. 12A to 12D as areas in which the distance from the rebar W1 is particularly short and work is therefore not possible.

With the handheld power tool 10 in this embodiment, the operator can check the lighting color displayed on the display unit 24, which changes on the basis of the detection result for the rebar W1 in the metal detector 20, and can designate areas where drilling or other such work is possible (areas without rebar W1) on the basis of the detection result. This means that the operator can safely carry out the work while preventing the tip tool 18a from coming into contact with rebar W1 during the work.

As mentioned above, the signal transmission and reception unit 36 can communicate with the signal transmission and reception unit 15 on the main body 11 side of the handheld power tool 10, and transmits the determination result by the determination unit 32 of the metal detector 20, for example. Also, the signal transmission and reception unit 36 receives from the main body 11 side an initialization signal for initializing the metal detector 20 when the reset switch 19 provided on the main body 11 side is operated, or when the orientation sensing unit 16 has sensed a specific orientation.

The initialization processing unit 37 performs initialization processing to erase the detection result of the rebar W1 stored in the memory unit 33 as a result of sensing of the orientation of the handheld power tool 10 by the orientation sensing unit 16, or by operation of the reset switch 19.

Working Method Using Handheld Power Tool 10 (Metal Detection Method)

Figure 13:
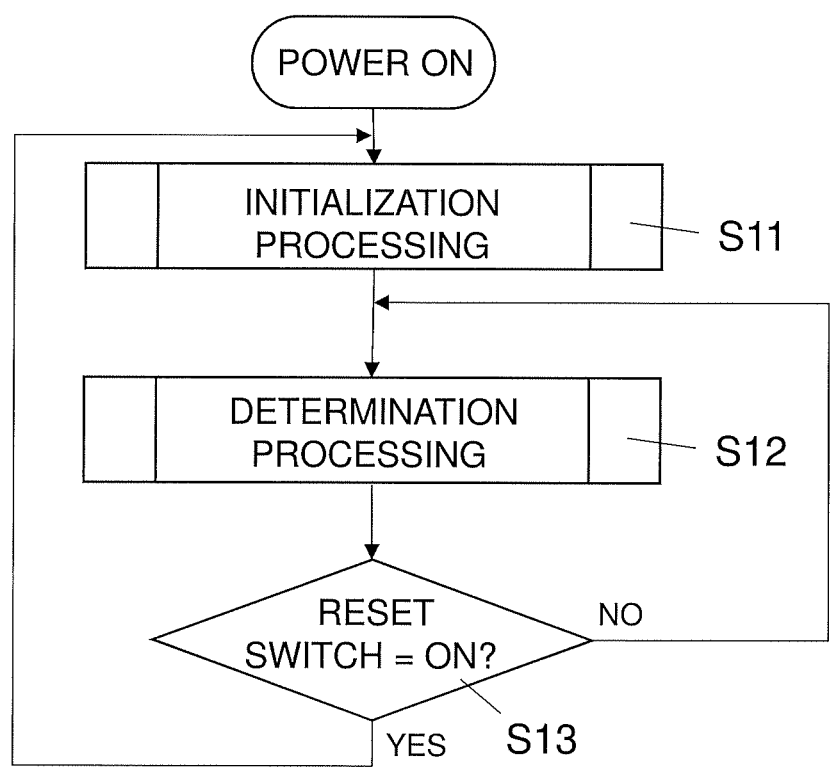
FIG. 13 is a main flowchart showing the flow of processing in a metal detection method and processing method using the handheld power tool in FIG. 1.
Figure 14:
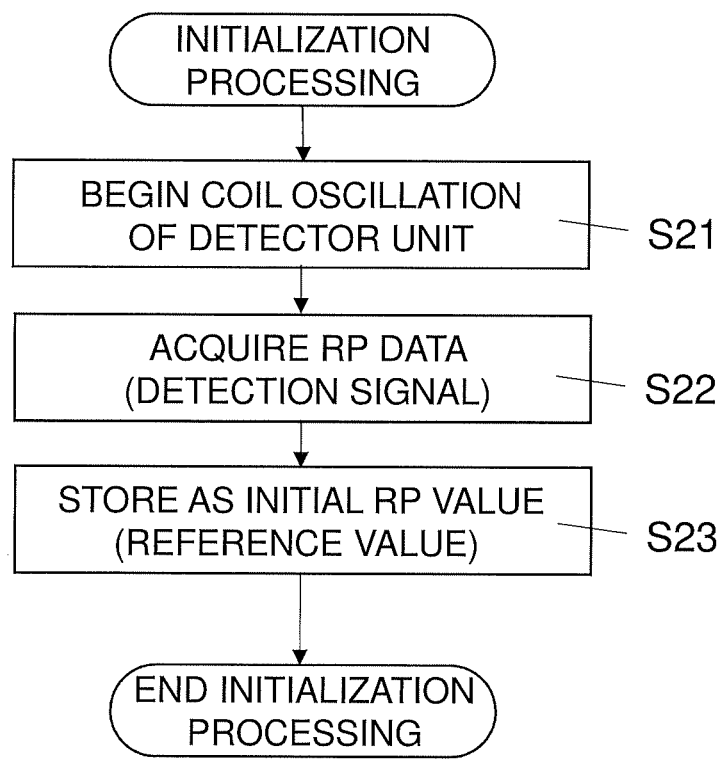
FIG. 14 is a flowchart showing the detailed flow of the initialization processing in FIG. 13.
Figure 15:
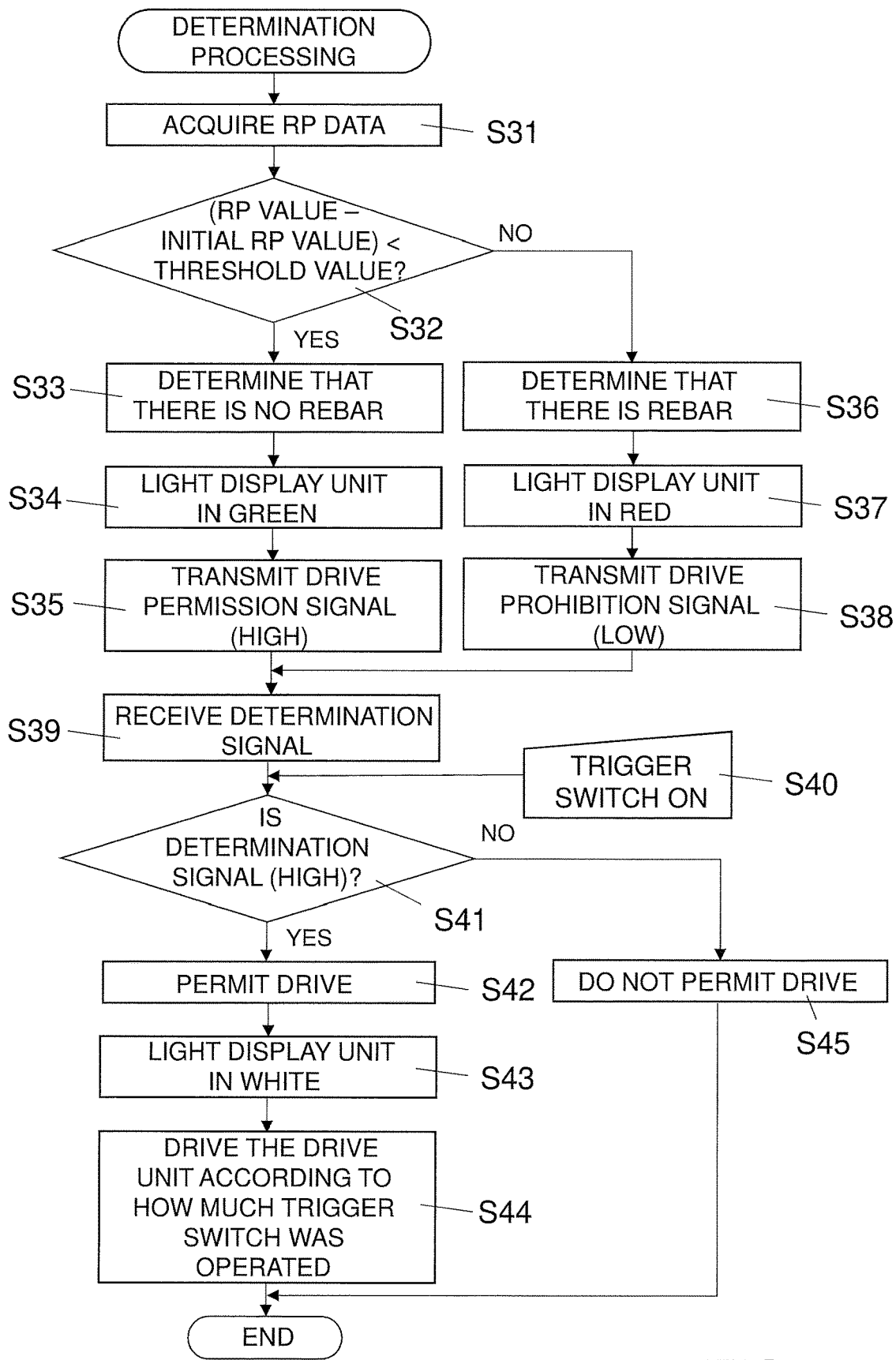
FIG. 15 is a flowchart showing the detailed flow of the maximum value and minimum value save processing in FIG. 13.

With the working method using the handheld power tool 10 in this embodiment, processing is performed according to the flowcharts shown in FIGS. 13 to 15 with the above configuration.

FIG. 13 shows the main flow, including initialization processing and determination processing performed in the handheld power tool 10.

That is, in step S11, when the power is turned on or the reset switch 19 is pressed, for example, initialization processing is performed by the initialization processing unit 37 of the metal detector 20 described above. More specifically, the initialization processing unit 37 performs initialization processing to erase the detection signal and determination result stored in the memory unit 33 of the metal detector 20.

At this point, the display control unit 34 lights the LEDs 24b of the display unit 24 in green to indicate the initial state shown in FIG. 10B.

Next, in step S12, the determination unit 32 of the metal detector 20 performs determination processing to determine whether or not there is rebar W1 at the position scanned by the metal detector 20.

At this point, the display control unit 34 lights the LEDs 24b of the display unit 24 in either green, yellow, or red corresponding to the determination result by the determination unit 32 (see FIGS. 10B to 12D).

Next, in step S13, it is determined whether or not the reset switch 19 has been operated to be in the ON state, and if it is ON, the processing goes back to step S11 and initialization processing is performed again to determine metal detection at another location, for example.

On the other hand, if the reset switch 19 is not in its ON state, the processing goes back to step S12, and the determination of metal detection at the same location, for example, is continuously performed without performing the initialization processing.

FIG. 14 shows the detailed flow of processing in the initialization processing of step S11 in FIG. 13.

That is, in step S21, the coil 22b of the detector unit 22 begins oscillating in order to acquire a detection signal for the rebar W1 in a state in which the metal detector 20 is in contact with the surface of the concrete W where the rebar W1 is to be detected.

Next, in step S22, the detection signal acquisition unit 31 of the metal detector 20 acquires Rp data (detection signal) indicating the degree to which the rebar W1 has been detected.

Next, in step S23, the acquired Rp data is stored in the memory unit 33 as an initial Rp value (reference value), and the initialization processing is ended.

FIG. 15 shows the detailed flow of processing in the determination processing of step S12 in FIG. 13.

That is, in step S31, in order to commence the detection of the rebar W1, the coil 22b of the detector unit 22 begins to oscillate in a state in which the metal detector 20 is in contact with the surface of the concrete W where the rebar W1 is to be detected, and the detection signal acquisition unit 31 acquires Rp data from the detector unit 22.

Next, in step S32, it is determined whether or not the difference (Rp value−initial Rp value) between the Rp value of the Rp data acquired in step S31 and the initial Rp value stored in the memory unit 33 in step 23 is smaller than a specific threshold value.

If this difference is smaller than the threshold value, the processing proceeds to step S33, but if the difference is greater than or equal to the threshold value, the processing proceeds to step S39.

Next, in step S33, since it was determined in step S32 that (Rp value−initial Rp value)<threshold value, the determination unit 32 determines that there is no rebar W1.

Next, in step S34, since it was determined in step S33 that there was no rebar W1, that area is determined to be an area in which drive is permitted, and the LEDs 24b of the display unit 24 are lit in green.

Next, in step S35, based on the determination result from the determination unit 32 of the metal detector 20, the signal transmission and reception unit 36 sends the main body 11 a drive permission signal (High) for permitting the drive of the motor 14 of the main body 11.

On the other hand, in step S36, since it was determined in step S32 that (Rp value−initial Rp value)<threshold value, the determination unit 32 determines that rebar W1 is present.

Next, in step S37, since it was determined in step S36 that there was rebar W1, that area is determined to be an area in which drive is prohibited, and the LEDs 24b of the display unit 24 are lit in red.

Regarding the green lighting control in step S34 and the red lighting control in step S37, the lights may be lit to yellow in between the green light and the red light according to the distance to the rebar W1 (the magnitude of the Rp value).

Next, in step S38, based on the determination result from the determination unit 32 of the metal detector 20, the signal transmission and reception unit 36 sends the main body 11 a drive prohibition signal (Low) for prohibiting the driving of the motor 14 of the main body 11.

Next, in step S39, the signal transmission and reception unit 15 on the main body 11 side receives a determination signal (drive permission signal (High) or drive prohibition signal (Low)) from the signal transmission and reception unit 36 on the metal detector 20 side.

Next, in step S40, when the trigger switch 12a is operated to the ON position, it is determined in step S41 whether or not the received determination signal is a drive permission signal (High).

Here, if the determination signal received by the signal transmission and reception unit 15 is a drive permission signal (High), the processing proceeds to step S42. On the other hand, if the received determination signal is a drive prohibition signal (Low), the processing proceeds to step S45.

Next, in step S42, since the determination signal received by the signal transmission and reception unit 15 was determined in step S41 to be a drive permission signal (High), the drive control unit 13 permits drive of the motor 14.

Next, in step S43, the signal transmission and reception unit 36 transmits a drive permission signal, and in step S36, the trigger switch 12a is operated to the ON position, so the display control unit 34 lights the LEDs 24b of the display unit 24 in white.

Next, in step S44, the drive control unit 13 controls the rotation speed of the motor 14 according to how much the trigger switch 12a has been operated, to rotationally drive the tip tool 18a.

Consequently, the operator can carry out the work in a state in which the worksite portion is brightly illuminated by white light when the concrete W is being worked while avoiding the rebar W1.

As a result, the work is easier and safer for the operator.

On the other hand, in step S45, since it was determined in step S41 that the determination signal received by the signal transmission and reception unit 15 was not a drive permission signal (High), the signal transmission and reception unit 15 is determined to have received a drive prohibition signal (Low), the drive of the motor 14 is not permitted, and the processing is ended.

Consequently, the drive control unit 13 can control not to drive the motor 14 by prohibiting the drive of the motor 14 on the main body 11 side, even if the trigger switch 12a is operated to the ON position in a drive prohibition area, when it has been determined that rebar W1 is in a drive prohibition area in step 39.

As a result, the tip tool 18a can be prevented from coming into contact with the rebar W1 due to accidental work in a drive prohibition area including rebar W1.

Also, with the handheld power tool 10 in this embodiment, since the metal detector 20 is provided on the distal end side, the concrete W can be worked while avoiding the rebar W1 and while performing the processing to detect the rebar W1.

This means that there is no need to perform work such as marking the surface of the concrete W, as opposed to when rebar is detected using a conventional metal detector provided separately from the handheld power tool.

As a result, the work from the detection of the rebar W1 to the working of the concrete W will be easier than in a conventional case.

Furthermore, since the metal detector 20 notifies the operator of whether or not there is rebar W1 by controlling the lighting of the LEDs 24b of the display unit 24, the metal detector 20 is easier to use in a noisy work environment than a conventional metal detector that notifies the operator with a warning sound.

Also, since the metal detector 20 is mounted in an integrated state on the distal end side of the handheld power tool 10, the work can be carried out continuously, from the detection of the rebar W1 to the working of the surface.

Furthermore, in this embodiment, if the metal detector 20 determines that rebar W1 is present, the color, number, etc., in which the lights are lit and displayed on the LEDs 24b of the display unit 24 are changes in stepwise fashion according to the distance to the rebar W1.

Consequently, on the surface of the concrete W, for example, the level can be set stepwise from the drive permission area to the drive prohibition area.

Here, the LEDs 24b showing the determination result for the presence or absence of rebar W1 in the metal detector 20 are disposed so as to face the inside diameter side of the substantially annular metal detector 20 (the tip tool 18a side of the handheld power tool 10).

This reduces the burden on the operator's eyes due to direct viewing of the light source, and because white light can be turned on during work using the handheld power tool 10, the place where the operator is working can be brightly illuminated to ensure better visibility.

The metal detector 20 can also be used alone, and the drilling work and metal detection can be performed in parallel.

Embodiment 2

A handheld power tool 100 according to another embodiment of the present invention will now be described with reference to FIGS. 16 to 19.

The handheld power tool 100 in this embodiment differs from Embodiment 1 above in that the dust collecting unit 40 is not attached to the main body 11, and the metal detector 20 is attached via a holder 101. In this embodiment, those components that are the same components as in the first embodiment are numbered the same and will not be described again.

Figure 16:
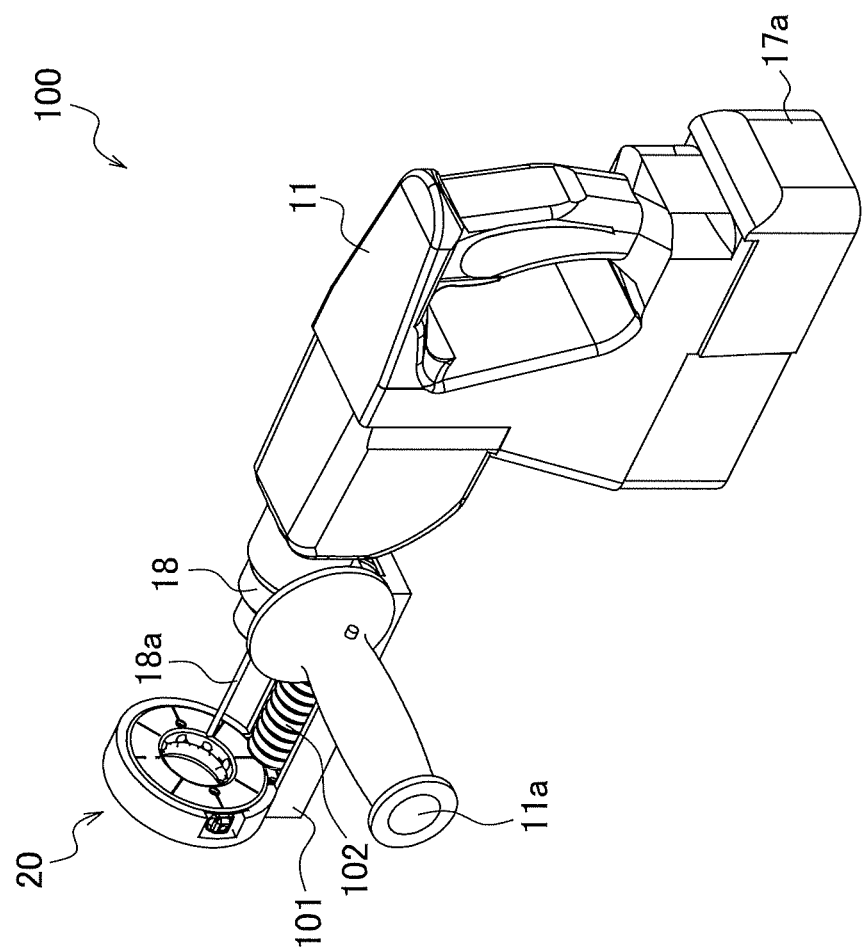
FIG. 16 is an oblique view of the configuration of a handheld power tool including the metal detector according to another embodiment of the present invention.

As shown in FIG. 16, the handheld power tool 100 of this embodiment does not have the dust collecting unit 40 of the first embodiment, and the metal detector 20 is attached to the distal end side via the holder 101.

Figure 17:
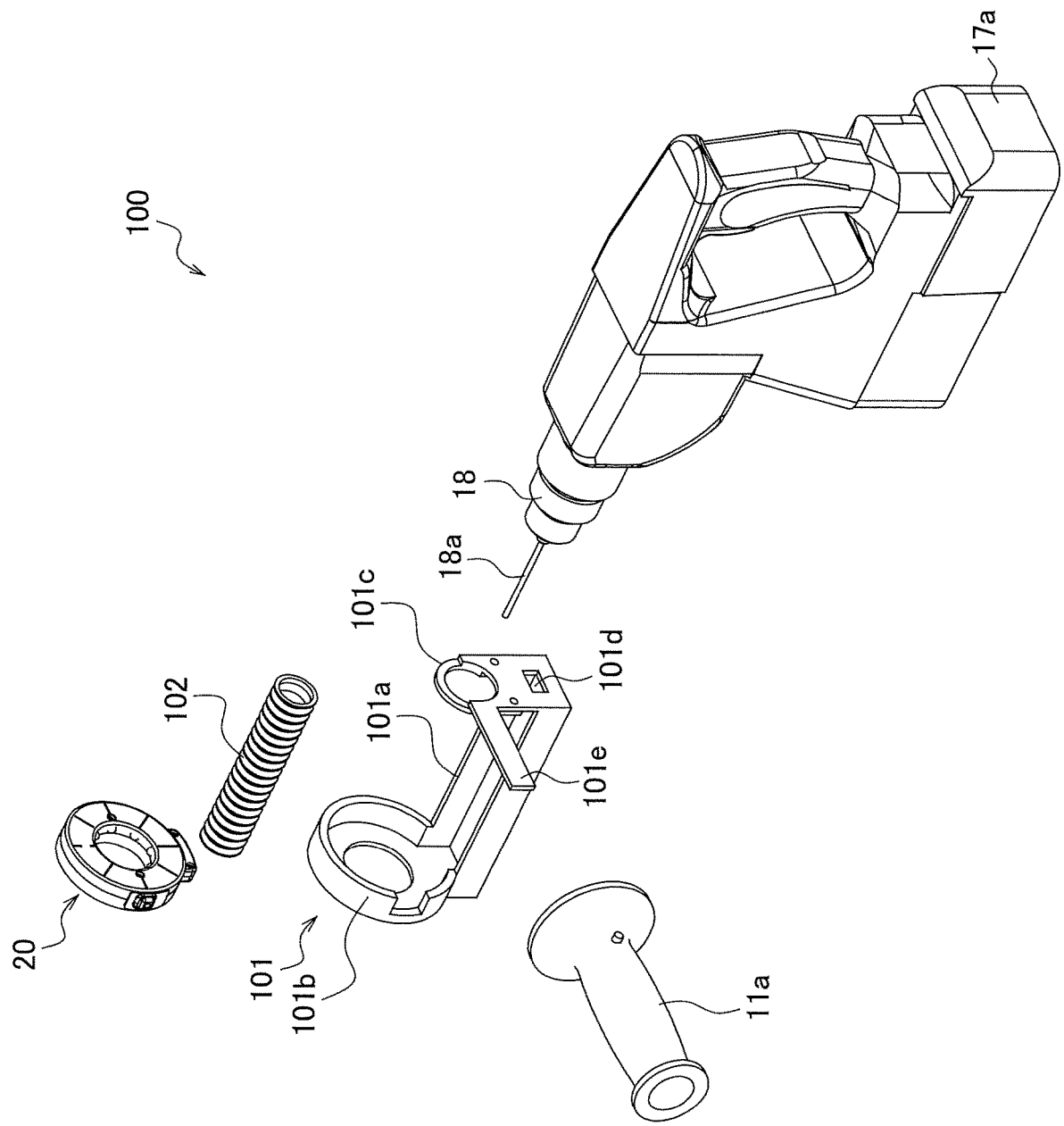
FIG. 17 is an exploded oblique view of the handheld power tool in FIG. 16.

As shown in FIG. 16, the holder 101 is attached to the distal end side of the main body 11 in order to integrate the main body 11 of the handheld power tool 100 with the metal detector 20. As shown in FIG. 17, the holder 101 has a telescoping beam 101a, a sensor holding portion 101b, a fixing portion 101c, a harness opening 101d, and a grip fixing portion 101e.

The telescoping beam 101a is a member that can be expanded and contracted toward the distal end side with respect to the main body 11, and a bellows member 102 through which a harness (not shown) is passed is disposed inside the concave shape.

This allows the length of the telescoping beam 101a to be adjusted to the proper length to match the length of the tip tool 18a, for example, and the telescoping beam 101a is extended when the tip tool 18a is to be attached to or detached from the tip portion 18, for example, which makes replacement much easier.

The sensor holding portion 101b is provided on the front end side of the holder 101, and the metal detector 20 is mounted from the rear end side.

The fixing portion 101c is a portion for fixing the holder 101 to the main body 11 of the handheld power tool 100, and the tip portion 18 of the main body 11 is inserted into the substantially annular portion thereof.

The harness opening 101d is an opening provided at the rear end of the holder 101, and a harness (not shown) is routed out of the metal detector 20 through the bellows member 102.

The grip fixing portion 101e is a member for fixing the grip portion 11a, and is provided so as to extend in a direction substantially perpendicular to the lengthwise direction of the holder 101.

The handheld power tool 100 in this embodiment is used in a state in which the metal detector 20 is integrated with the main body 11 via the holder 101.

This affords the same effect as that of the first embodiment.

Here, the handheld power tool 100 of this embodiment may be a handheld power tool 200 configured such that the metal detector 20 retracts from the position being worked by the tip tool 18a after the determination of the presence or absence of rebar W1 by the metal detector 20.

Figure 18A:
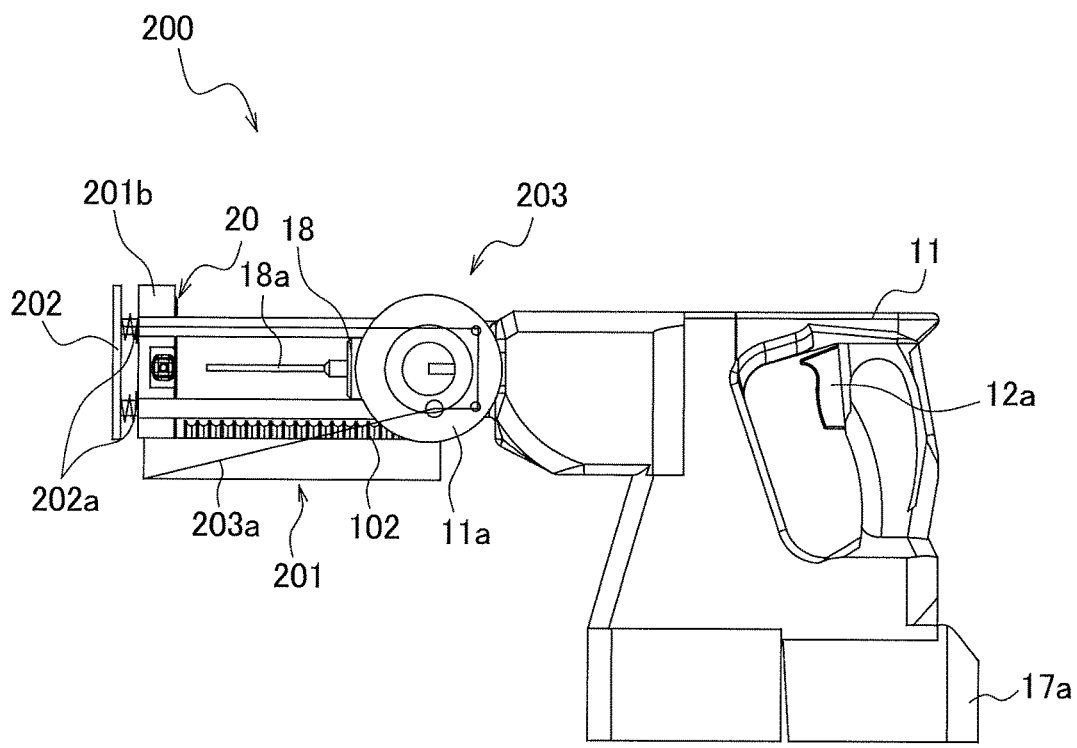
FIGS. 18A and 18B are side views illustrating a retracting mechanism included in the handheld power tool in FIG. 16.
Figure 18B:
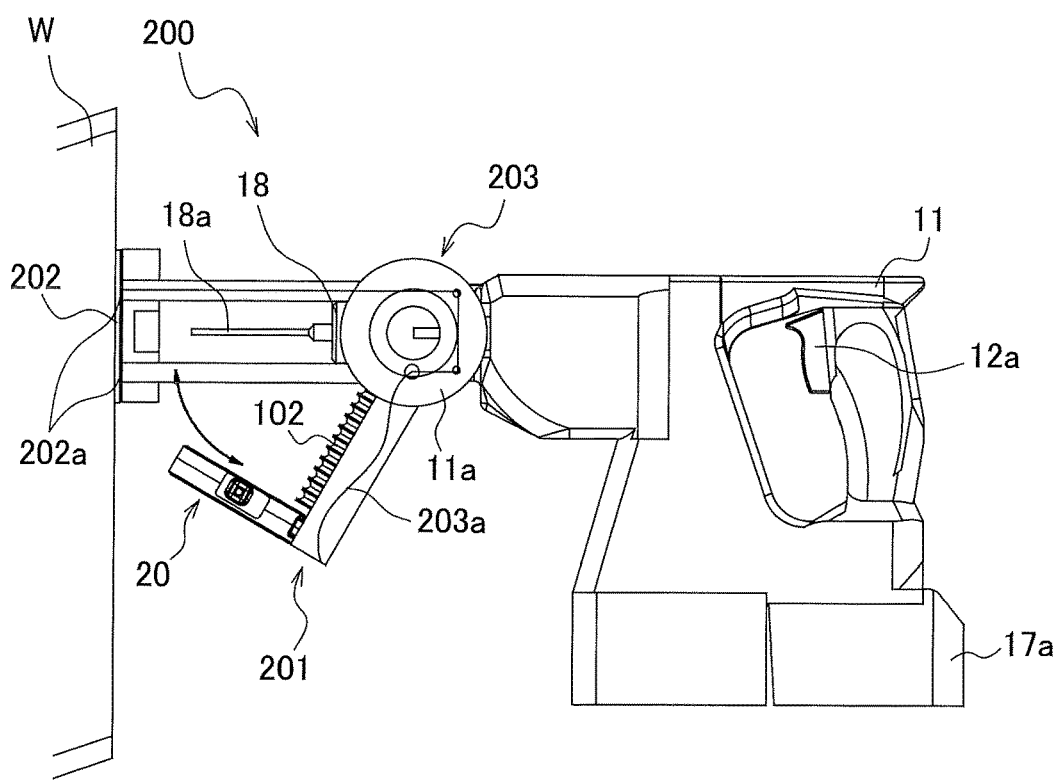

That is, as shown in FIGS. 18A and 18B, with the handheld power tool 200, when the metal detector 20 disposed at the distal end of the holder 101 is rotated (moved) downward, the metal detector 20 is retracted from near the tip tool 18a of the handheld power tool 200 so that drilling work can be performed.

A retracting mechanism 203 for retracting the metal detector 20 downward is provided near the connected portion between the main body 11 and a holder 201, and includes a wire 203a as shown in FIG. 18A.

The metal detector 20 is attached from the rear end side to a sensor holding portion 201b of the holder 201.

A contact detector (contact detection unit) 202 for detecting contact with the surface of the concrete W is provided on the distal end side of the sensor holding portion 201b.

The contact detector 202 is, for example, a strain sensor or a photosensor, is attached to the surface of the sensor holding portion 201b on the distal end side via the spring 202a, and is biased toward the distal end side. Also, when the contact detector 202 comes into contact with the surface of the concrete W, the spring 202a contracts to effect a change from the OFF state to the ON state.

Figure 19:
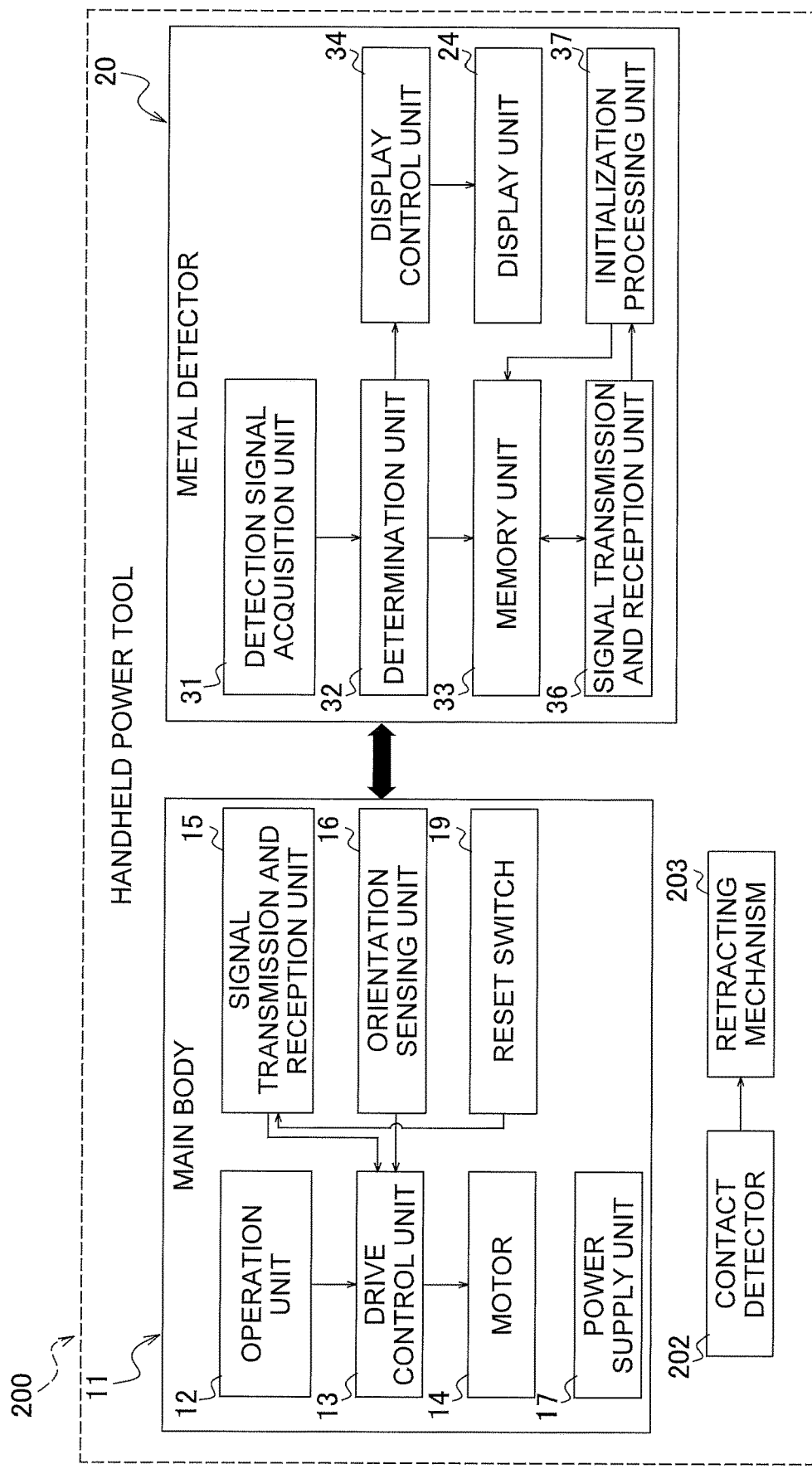
FIG. 19 is a control block diagram of the handheld power tool in FIG. 16.

Also, as shown in FIG. 19, the contact detector 202 is provided as a component of the metal detector 20. When contact with the concrete W surface is detected, the retracting mechanism 203 moves the metal detector 20 to the retracted position.

At this point, in the normal state, the contact detector 202 is biased away from the metal detector 20 by the biasing force of the spring 202a. Accordingly, tension is also applied to the internal wire 203a, and the horizontal state of the holder 201 is maintained (see FIG. 18A).

Then, when the handheld power tool 200 is pressed against the surface of the concrete W during drilling work or the like, the spring 202a is compressed and the tension of the wire 203a inside is also relaxed, causing the metal detector 20 to rotate downward and out of the way, along with the holder 201, under the force of gravity (see FIG. 18B).

As a result, when work is performed on the concrete W using the tip tool 18a, it is possible to reduce the load, such as the exposure of the metal detector 20 to dust and the application of vibration.

When the handheld power tool 200 is moved away from the surface of the concrete W at the end of the work, the contact detector 202 is again biased away from the metal detector 20 by the biasing force of the spring 202a, tension on the internal wire 203a is also restored along with this, and the metal detector 20 returns to its normal position.

In this embodiment, an example was given in which the retracting mechanism 203 was operated when the contact detector 202 came into contact with the surface of the concrete W, but a push button switch or the like may be manually operated to retract the metal detector 20 from the distal end side of the handheld power tool 10, for example.

Also, the initialization processing unit 37 may perform initialization processing when the contact detector 202 detects contact with the surface of the concrete W.

Other Embodiments

An embodiment of the present invention was described above, but the present invention is not limited to or by the above embodiment, and various modifications can be made without departing from the gist of the invention.

(A)

In the above embodiment, an example was given in which the present invention was realized as a handheld power tool and a working method that makes use of a handheld power tool. However, the present invention is not limited to this.

For instance, the present invention may be realized as a working program for causing a computer to execute the above-mentioned working method that makes use of handheld power tool.

This working program is stored in a memory (memory unit) that is installed in the handheld power tool, and the CPU reads the program stored in the memory and causes the hardware to execute various steps. More specifically, the same effect as above can be obtained by having the CPU read the working program and execute the above-mentioned detection signal acquisition step, determination step, display control step, and drive step described above.

The present invention may also be realized as a recording medium in which such a processing program is stored.

(B)

In the above embodiment, an example was given in which a plurality of rotatable rollers 46a were provided on the contact surface 46 formed on the distal end side of the metal detector 20. However, the present invention is not limited to this.

That is, it is preferable for the contact surface with the concrete surface to be configured or to undergo treatment so as to reduce frictional resistance, in order to make the work easier when scanning the metal detector over the concrete surface to detect rebar.

Figure 20A:
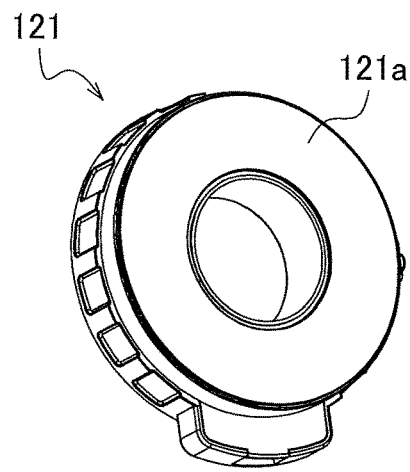
FIGS. 20A, 20B, and 20C are oblique views of the configuration of the metal detector according to another embodiment of the present invention.

For instance, as shown in FIG. 20A, a metal detector 121 may have a surface treated portion 121a (for reducing friction) formed on the side that comes into contact with the concrete.

Figure 20B:
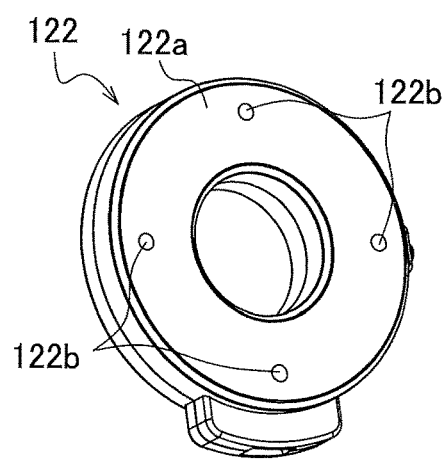

Also, as shown in FIG. 20B, a metal detector 122 may be provided with a plurality of balls 122b that rotate while in contact with the surface of the concrete, on a surface 122a that is on the side in contact with the concrete.

Figure 20C:
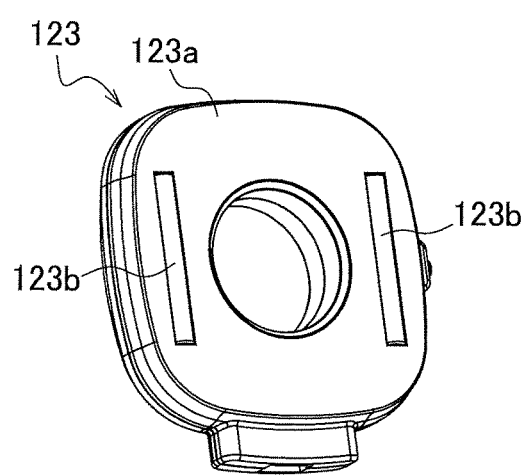

Furthermore, as shown in FIG. 20C, a metal detector 123 may be provided with two roller portions 123b that rotate while in contact with the surface of the concrete, on a surface 123a that is on the side in contact with the concrete.

With all of the above configurations, the metal detector can be moved smoothly over the concrete surface, which makes the work easier. Furthermore, the durability of the metal detector can be improved if the metal detector is not brought directly into contact with the concrete.

(C)

In the above embodiment, an example was given in which the operator was notified of the detection result for the rebar W1 by the metal detector 20 by lighting in three colors of green, yellow, and red. However, the present invention is not limited to this.

For instance, the means for notifying of the detection result by the metal detector need not be expressing the result with light of different colors as in the above embodiment, and may instead be some other means, such as text information or voice information.

Also, in the above embodiment, an example was given in which the operator was notified of the approach (presence or absence) of metal by using three colors of light, but the operator may instead be notified of the approach of metal by using light of two colors or of four or more colors.

(D)

In the above embodiment, an example was given in which the operator was notified of the detection result for the rebar W1 by the metal detector 20 by lighting the eight LEDs 24b in a plurality of different colors. However, the present invention is not limited to this.

For instance, the display unit for turning on the lamps is not limited to eight LEDs, and seven or fewer, or nine or more LEDs may be used, or a light source other than LEDs may be used.

(E)

In the above embodiment, an example was given of a method for detecting rebar contained in concrete, in which an inductive type of metal detector was used that sensed the impedance of a detection coil, which changes with the eddy current generated in the metal (the object to be detected) as the metal approaches the magnetic field generated by passing a current through the coil included in the detector unit. However, the present invention is not limited to this.

For instance, a metal detector that employs some other method may be used, such as a capacitance type that senses changes in capacitance produced between the detector and the metal to be detected, or a high-frequency oscillation method that detects non-ferrous metal such as aluminum.

(F)

In the above embodiment, an example was given in which impedance changes in the winding coil 22b wound around the detector unit 22 were detected to detect the presence or absence of the rebar W1. However, the present invention is not limited to this.

For instance, a pattern type coil may be used instead of a wound coil to detect the changes in impedance and detect the metal.

(G)

In the above embodiment, an example was given in which the initialization processing of the detection result by the metal detector 20 either involved control performed depending on sensing the orientation of the handheld power tool 10, or was performed by pressing the reset switch 19. However, the present invention is not limited to this.

For instance, the initialization processing of the detection result by the metal detector may be configured so that only one of the above two controls can be performed, or initialization processing may be performed by some means other than the above two controls, such as a level gauge.

Also, the position of the reset switch used to perform initialization processing is not limited to the position described in the above embodiment, and this reset switch may instead be provided at some other position in the handheld power tool or the metal detector.

(H)

In the above embodiment, an example was given in which the metal detector 20 was used in a state where it could be attached to and detached from the main body 11 of the handheld power tool 10. However, the present invention is not limited to this.

For instance, the metal detector may be configured to be integrated with the main body of the handheld power tool in a non-detachable state.

(I)

In the above embodiment, an example was given in which concrete in which rebar was embedded served as the target to be subjected to work with the handheld power tool 10. However, the present invention is not limited to this.

For instance, the target may be drywall or another such wall material, and the handheld power tool may be one that performs any of various types of work while metal contained in the wall material is being detected.

Also, the metal in the target is not limited to being rebar, and may instead be some other metal member, such as a frame or a bolt.

(J)

In the above embodiment, an example was given in which the present invention was applied to a hammer drill as an example of a handheld power tool. However, the present invention is not limited to this.

For instance, the handheld power tool to which the present invention is applied may be some other handheld power tool, such as an impact drill or a vibration drill.

INDUSTRIAL APPLICABILITY

The metal detector of the present invention has the effect of allowing an operator to be notified of the presence or absence of metal inside a target such as concrete, without coming into contact with the metal, and therefore can be widely applied to various work tools that perform work while detecting metal.

The invention claimed is:

1. A handheld power tool that detects a metal contained in a target and performs work on the target, the handheld power tool comprising:
    a main body;
    an arm portion which is attached to the main body in a state that allows forward and backward thereof;
    a detection signal acquisition unit configured to acquire a detection signal which changes according to a detection intensity of the metal contained in the target;
    a determination unit configured to determine a presence or absence of the metal on the basis of an acquisition result acquired by the detection signal acquisition unit;
    a display unit having a-light emitter and a substantially annular substrate, configured to display the presence or absence of the metal by turning on different lights, the light emitter that is disposed on the substrate, facing toward an opening formed in a center of the substrate, the display unit being disposed at a distal end of the arm portion;
    a display control unit configured to control the display unit so as to switch a color of the light displayed on the display unit on the basis of a determination result from the determination unit;
    a drive unit configured to rotationally drive a tip tool that performs work on the target; and
    a drive control unit configured to control a drive of the drive unit, wherein
    when the determination unit has determined that the metal is absent, the drive control unit permits the drive of the drive unit,
    the display control unit controls the display unit so as to emit auxiliary light that illuminates a portion to be worked by the tip tool, and
    the opening of the display unit is served as a work hole into which the tip tool is inserted.

2. The handheld power tool according to claim 1, wherein the drive control unit prohibits the drive of the drive unit when the determination unit has determined that the metal is present.

3. The handheld power tool according to claim 1, wherein the display control unit controls the display unit so as to emit white light as the auxiliary light.

4. The handheld power tool according to claim 1, wherein the determination unit determines the presence or absence of the metal by comparing the acquisition result acquired by the detection signal acquisition unit with a specific threshold value.

5. The handheld power tool according to claim 1, further comprising:
    a main body that includes the drive unit and the drive control unit;
    an orientation sensing unit configured to sense an orientation of the main body; and
    an initialization processing unit configured to initialize a result acquired by the detection signal acquisition unit when the orientation sensing unit has sensed that the main body is in a specific orientation.

6. The handheld power tool according to claim 1, further comprising:
    a metal detector that includes the detection signal acquisition unit, the display unit, and the display control unit;
    a main body that has a distal end part to which the metal detector is attached; and
    a contact portion that is provided to the distal end part of the main body and comes into contact with the target,
    wherein the contact portion has a roller portion configured to rotate along a movement direction of the main body in a state of being in contact with the target.

7. The handheld power tool according to claim 1, further comprising:
    a metal detector that includes the detection signal acquisition unit, the display unit, and the display control unit;
    a main body that has a distal end part to which the metal detector is attached; and
    a contact portion that is provided to the distal end part of the main body and comes into contact with the target,
    wherein the contact portion has a friction reducing portion configured to reduce a friction with the target.

8. The handheld power tool according to claim 1, further comprising:
    a contact detection unit configured to detect a contact with the target.

9. The handheld power tool according to claim 8,
    wherein the contact detection unit is a contact switch configured to change from an OFF state to an ON state upon coming into contact with the target.

10. The handheld power tool according to claim 8, further comprising:
    a metal detector that includes the detection signal acquisition unit, the display unit, and the display control unit;
    a main body that has a distal end part to which the metal detector is attached; and
    a retracting mechanism configured to retract the metal detector from the distal end part of the main body when the contact detection unit has detected a contact with the target.

11. The handheld power tool according to claim 1, further comprising:
    a metal detector that includes the detection signal acquisition unit, the display unit, and the display control unit;
    a main body that has a distal end part to which the metal detector is attached; and
    a dust collecting unit configured to draw in an outside air around the distal end part of the main body.

12. The handheld power tool according to claim 11,
    wherein the dust collecting unit is detachably attached to the main body.

13. The handheld power tool according to claim 1, further comprising:
    a metal detector that includes the detection signal acquisition unit, the display unit, and the display control unit; and
    a main body to which the metal detector is attached; and
    wherein the metal detector is detachably attached to the main body.

* * * * *